US012687054B2

(12) United States Patent
Yadollahi

(10) Patent No.: US 12,687,054 B2
(45) Date of Patent: Jul. 21, 2026

(54) DELAY LATCH FOR A DOOR

(71) Applicant: Adams Rite Aerospace, Inc., Fullerton, CA (US)

(72) Inventor: Morteza Yadollahi, Irvine, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 88 days.

(21) Appl. No.: 18/472,281

(22) Filed: Sep. 22, 2023

(65) Prior Publication Data

US 2024/0102326 A1 Mar. 28, 2024

Related U.S. Application Data

(60) Provisional application No. 63/409,104, filed on Sep. 22, 2022.

(51) Int. Cl.
*E05C 1/16* (2006.01)

(52) U.S. Cl.
CPC .................................... *E05C 1/16* (2013.01)

(58) Field of Classification Search
CPC ...... E05B 17/0041; E05B 77/42; E05B 63/18; E05C 1/16; B64C 1/1469
See application file for complete search history.

(56) References Cited

U.S. PATENT DOCUMENTS

| | | | | |
|---|---|---|---|---|
| 4,355,830 A * | 10/1982 | Rau, III | E05B 47/0002 292/144 |
| 2014/0319850 A1 | 10/2014 | Berger et al. | |
| 2023/0036826 A1 * | 2/2023 | Brewster | B64C 1/1469 |

FOREIGN PATENT DOCUMENTS

| | | | |
|---|---|---|---|
| CN | 107355131 A | 11/2017 | |
| CN | 113931532 A | 1/2022 | |
| WO | WO-2007082525 A2 * | 7/2007 | E05B 15/0205 |
| WO | 2018/102351 A2 | 6/2018 | |

OTHER PUBLICATIONS

Invitation to Pay Additional Fees and Partial International Search Report of corresponding International Application No. PCT/US2023/074815, dated Feb. 7, 2024, 9 pages.

* cited by examiner

*Primary Examiner* — Christine M Mills
*Assistant Examiner* — Yahya Sidky
(74) *Attorney, Agent, or Firm* — Tucker Ellis LLP

(57) ABSTRACT

Provided is a latch assembly for a door. The latch assembly includes a housing defining a cavity, a handle movable relative to the housing, a latch disposed in the cavity, the latch having bolt movable between a locked and an unlocked position and a damping mechanism for delaying movement of the latch, wherein the handle is biased in a first position abutting the bolt to hold the bolt in the locked position, and the handle is movable to a second position away from the bolt allowing for movement of the bolt to the unlocked position.

14 Claims, 24 Drawing Sheets

DELAY LATCH FOR A DOOR

RELATED APPLICATIONS

This application claims the benefit of U.S. Provisional Application No. 63/409,104 filed Sep. 22, 2022, which is hereby incorporated herein by reference.

FIELD OF INVENTION

The present invention relates generally to a latch, and more particularly to a latch for a door.

BACKGROUND

Aircrafts include a variety of doors, such as lavatory doors and a cockpit door. A variety of latch mechanisms may be used with the doors.

SUMMARY OF INVENTION

According to an aspect, a latch assembly is provided that includes a housing defining a cavity, a handle movable relative to the housing, a latch disposed in the cavity, the latch having bolt movable between a locked and an unlocked position and a damping mechanism for delaying movement of the latch, wherein the handle is biased in a first position abutting the bolt to hold the bolt in the locked position, and the handle is movable to a second position away from the bolt allowing for movement of the bolt to the unlocked position.

According to another aspect, a latch assembly is provided that includes a housing defining a cavity, a handle assembly coupled to the housing, and a latch disposed in the cavity, the latch having a lock bar movable between a locked and an unlocked position, a damping mechanism for delaying movement of the lock bar, an overcenter assembly, and a bracket having an end configured to couple to a wall and an end configured to held by the overcenter assembly, wherein the handle assembly is movable from a first position abutting the lock bar to hold the lock bar in the locked position to a second position allowing for movement of the lock bar to the unlocked position thereby allowing the overcenter assembly to release the bracket.

According to still another aspect, a latch assembly for delaying opening of a door in an aircraft is provided that includes a housing defining a cavity, a handle, a latch disposed in the cavity, the latch being movable between a locked and an unlocked position and including a damping mechanism for delaying movement of the latch, wherein the handle is movable from a first position holding the latch in the locked position to a second position allowing for movement of the latch to the unlocked position to allow for opening of the door.

The foregoing and other features of the application are described below with reference to the drawings.

DETAILED DESCRIPTION

The principles of the present application relate to a latch, such as a delay latch for door in an aircraft, and thus will be described below in this context. It will be appreciated that the principles of the application may be applicable to aches for other structures and vehicle types.

Figure 1:
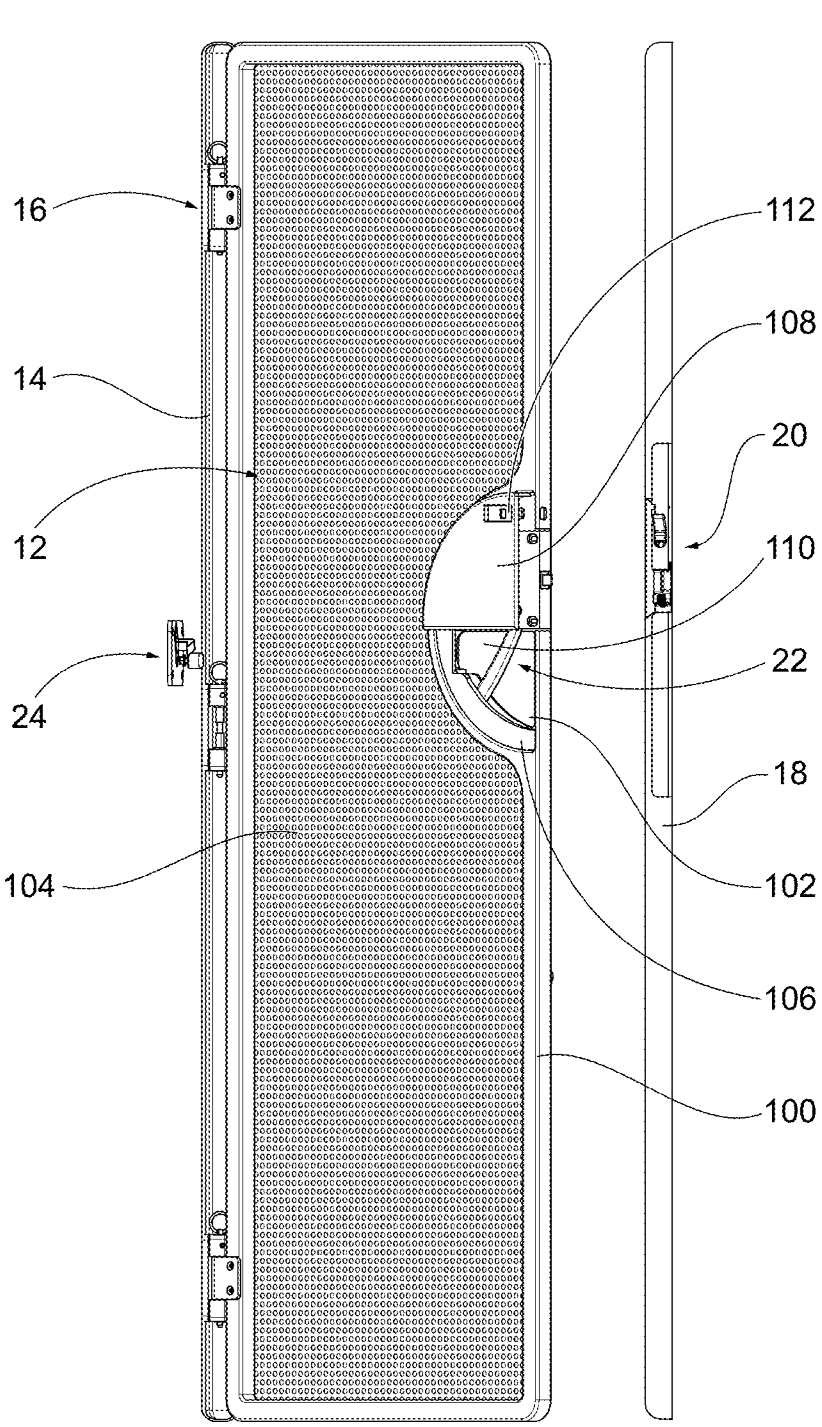
FIG. 1 is a perspective view of an exemplary door assembly.
Figure 2:
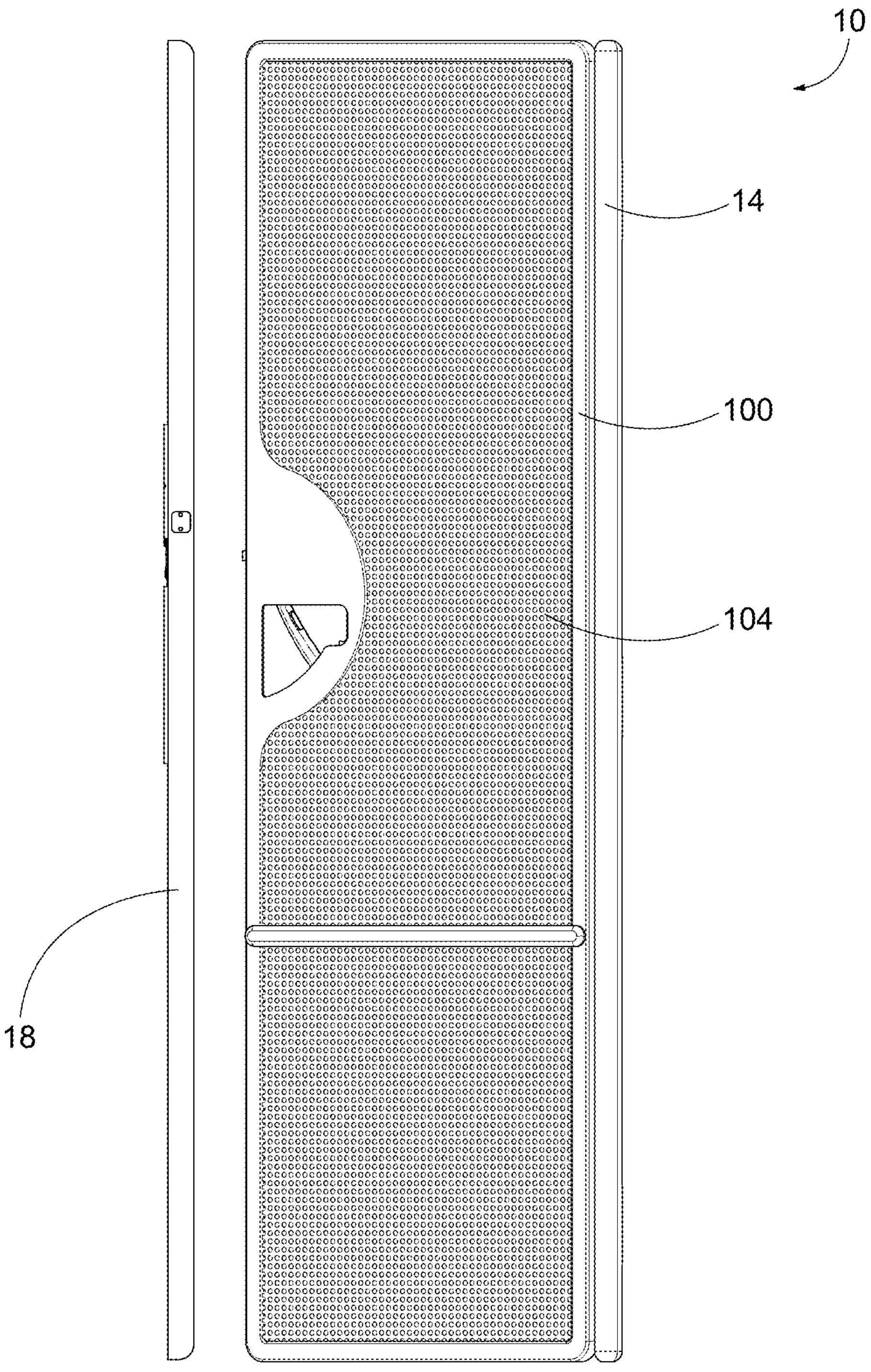
FIG. 2 is another perspective view of the door assembly.

Turning initially to FIGS. 1 and 2, a door assembly is shown generally at reference numeral 10 in an open position. The door assembly 10 includes a door 12, a hinge cover 14 configured to couple to a first wall of an aircraft, a plurality of hinge assemblies 16 spaced along a length of the hinge cover 14 and coupled to the hinge cover 14 and door 10, a striker frame 18 configured to be coupled to a second wall opposite the first wall, a striker assembly 20 coupled to the striker frame 18, a delay latch assembly 22 coupled to the door 10 for engaging the striker assembly 20 to hold the door 12 in a closed position, and a stowage assembly 24 configured to be coupled to the first wall to hold the door 12 in the open position.

The delay latch assembly 22 may be used to provide a predetermined time delay in opening the door 12. For example, the door assembly 10 may be provided in the aircraft near the cockpit to serve as a secondary barrier to provide for a delayed opening time of the door 12 to allow the pilot to close the cockpit door while remaining behind a locked door. The predetermined time may be a suitable time such as five seconds, ten seconds, etc., and the delay time may be adjustable as discussed below.

Figure 3:
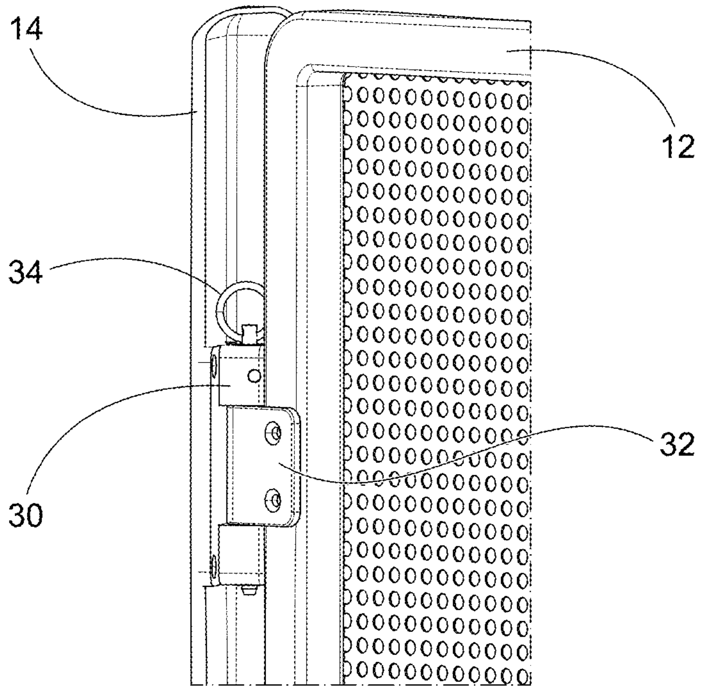
FIG. 3 is a perspective view of a portion of the door assembly.

Turning additionally to FIG. 3, each hinge assembly 16 includes a hinge base 30 coupled to the hinge cover 14, a door hinge 32 coupled to the door 12, and a hinge pin 34 extending through corresponding openings in the hinge base 30 and door hinge 32. The hinge base 30 and door hinge 32 may be coupled to the hinge cover 14 and door 12 respectively in a suitable manner, such as by suitable fasteners. The hinge pins 34 are provided on the side of the door facing the cockpit such that the hinge pins 34 may be removed from the pilot's side of the door 12 to allow the door 12 to be opened even if the latch assembly 22 is engaged. In an implementation, a cabin facing portion of the hinge cover 14 may be removable from a cabin side of the door 12 to allow the hinge pins 34 to be removed from a user in the cabin. In this instance, the amount of time required to remove the cover and then the hinge pins 34 will cause a delay in accessing the cockpit that is equal to or greater than the delay caused by the delay latch assembly 22.

Figure 4:
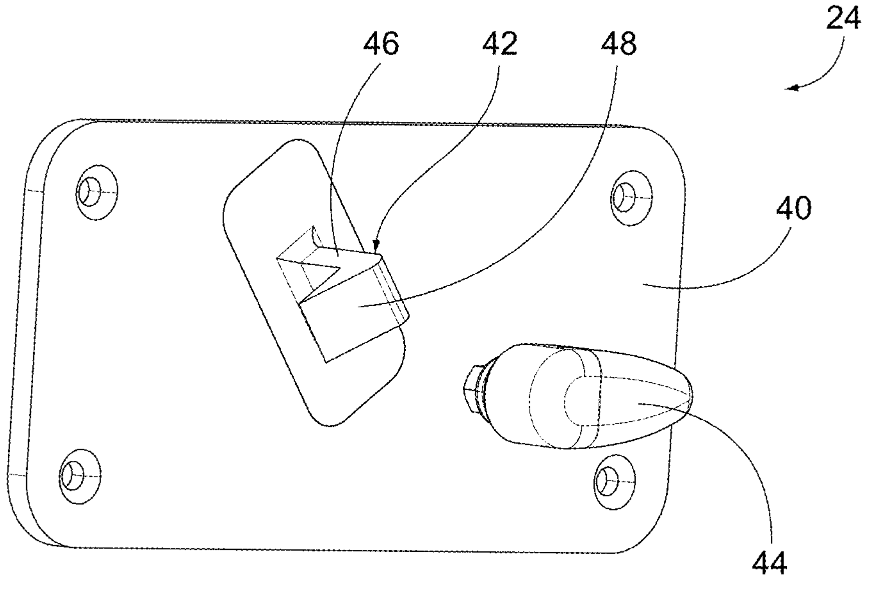
FIG. 4 is a perspective view of a stowage assembly.

Turning now to FIG. 4, the stowage assembly 24 includes a plate 40 configured to be coupled to the first wall, a fixed latch 42 coupled to the plate 40, and a movable latch 44 coupled to the plate 40. The fixed latch 42 has a first portion 46 that projects substantially perpendicular from the plate 40 and a second portion 48 substantially perpendicular to the first portion 46 and including an angled surface for engaging with the delay latch assembly 22. The movable latch 44 is rotatable relative to the plate 40 to engage the delay latch assembly 22 to provide a secondary latch when the door 12 is stowed.

Figure 5:
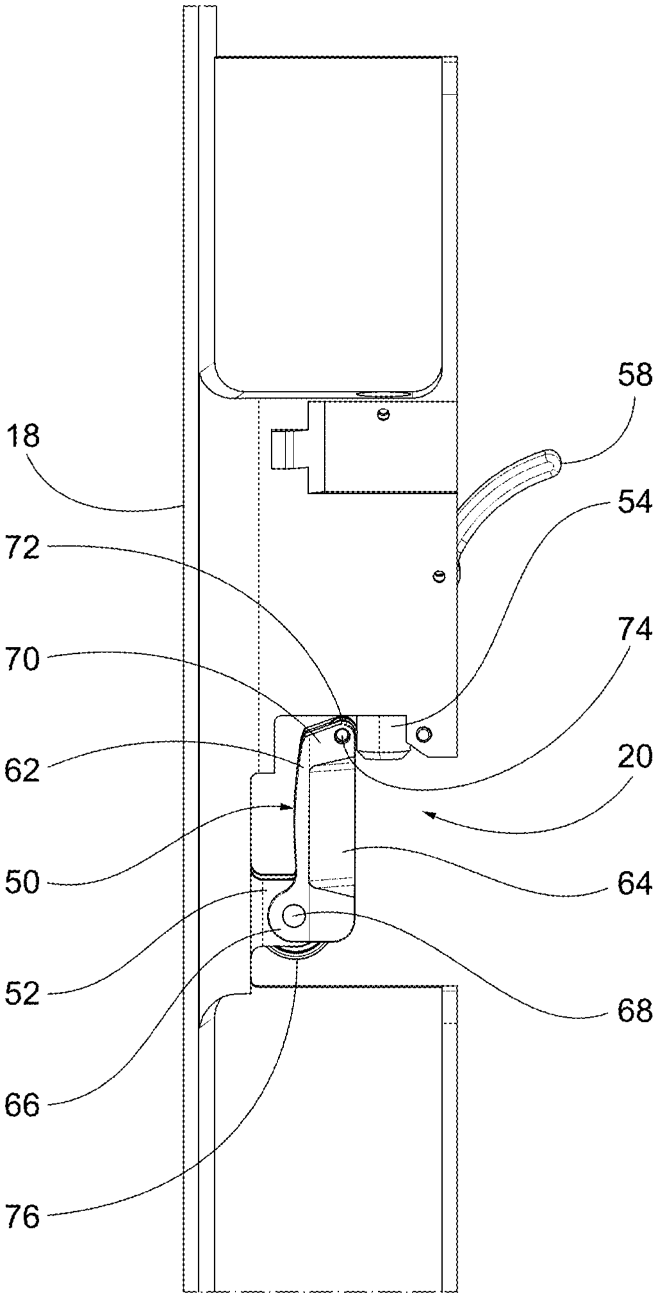
FIG. 5 is a side view of a portion of a striker frame and of a striker assembly.
Figure 6:
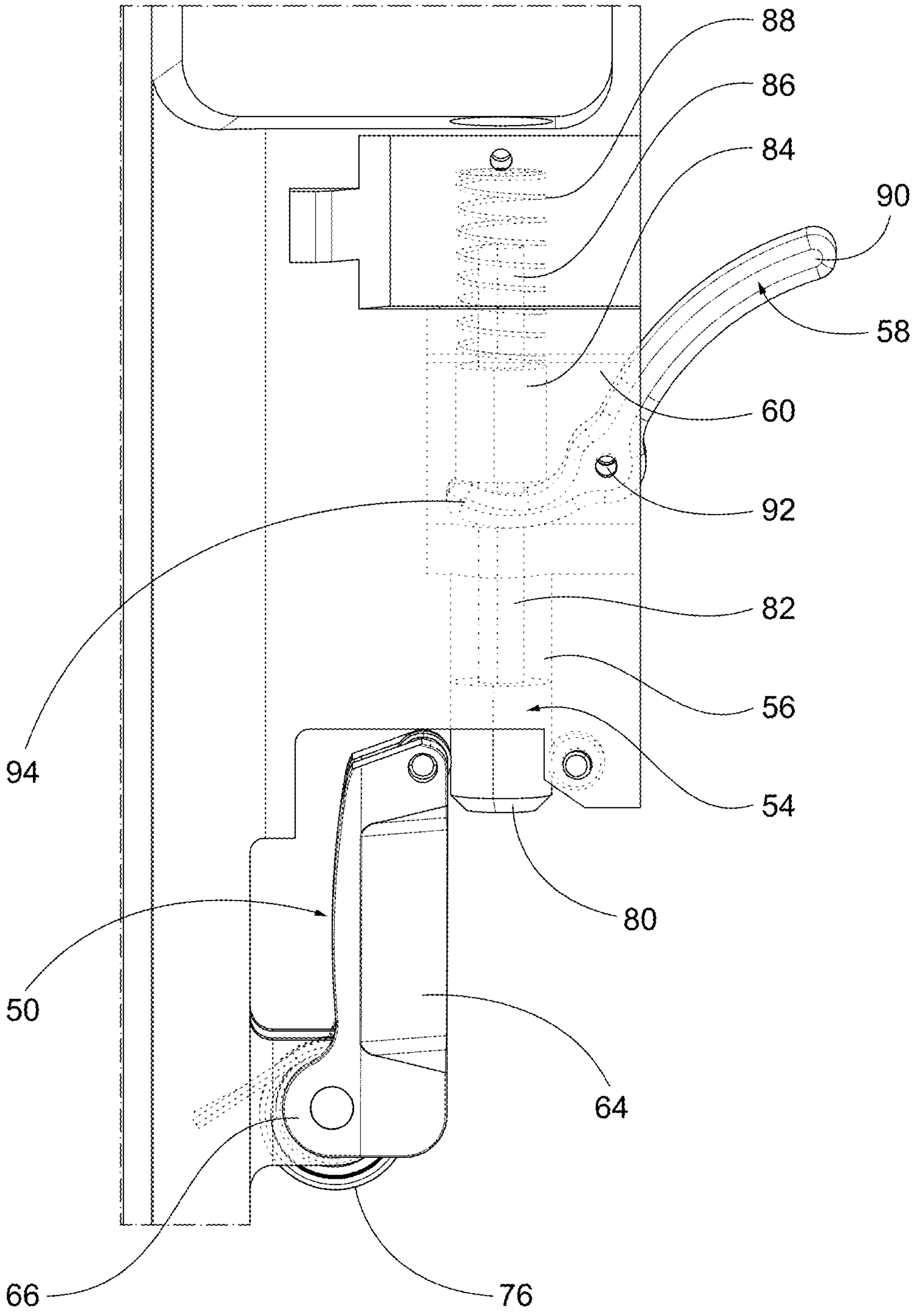
FIG. 6 is another side view of the striker frame and striker assembly.
Figure 7:
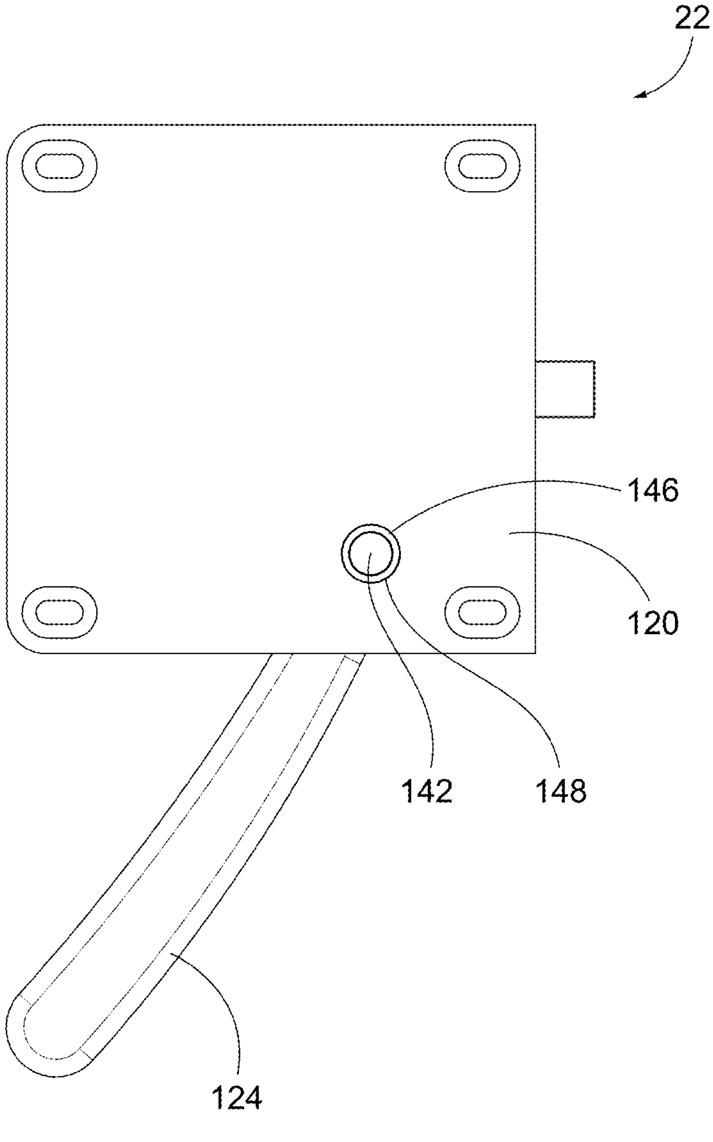
FIG. 7 is a side view of a latch assembly.
Figure 8:
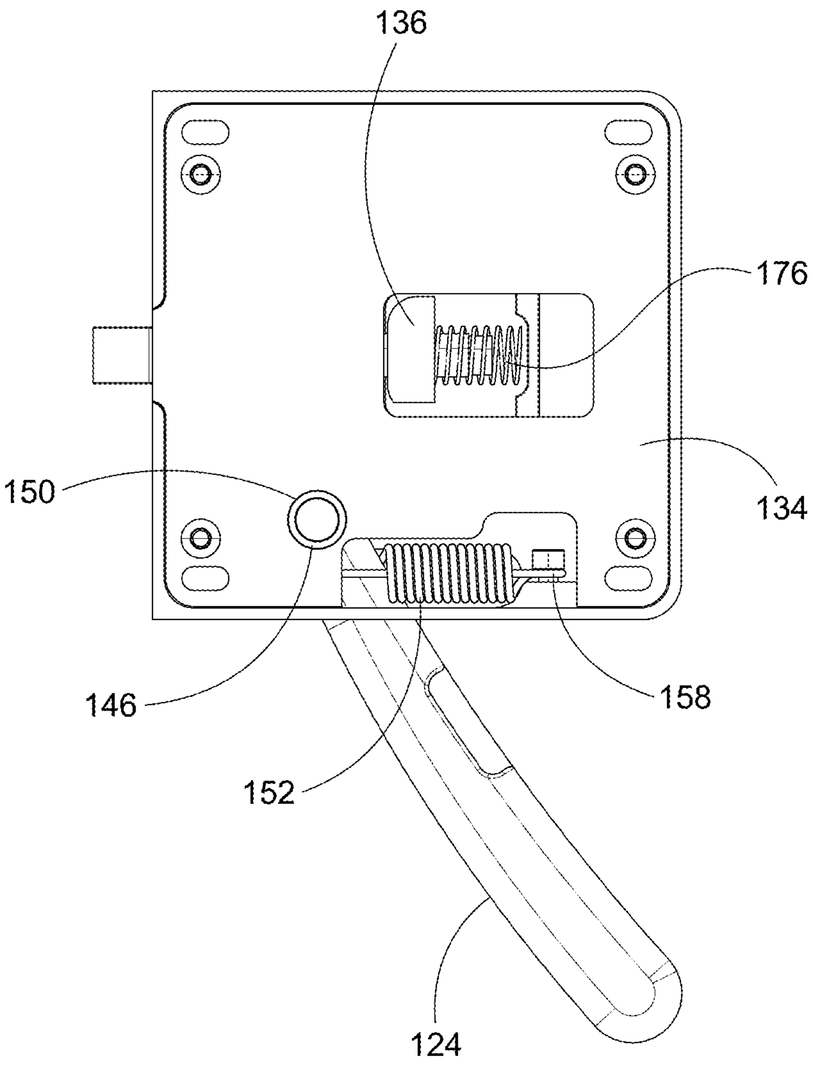
FIG. 8 is another side view of the latch assembly.
Figure 9:
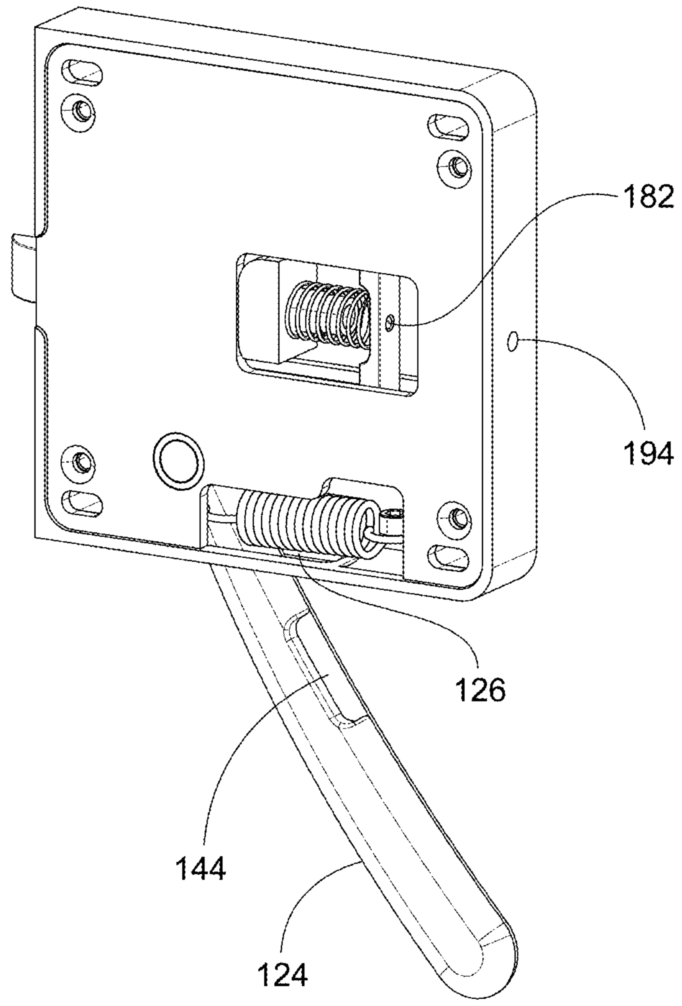
FIG. 9 is a perspective view of the latch assembly.

Turning now to FIGS. 5 and 6, the striker assembly 20 is shown in detail, where the striker frame 18 is transparent in FIG. 6. The striker assembly 20 includes a catch 50 pivotally coupled to ears 52 projecting from the striker frame 18, a release shaft 54 disposed in a passage 56 in the striker frame 18, and a release lever 58 disposed in a passage 60 in the striker frame 18 and pivotally coupled to the striker frame 18. The catch 50 includes a body 62 having an angled surface 64, a first pair of ears 66 projecting from a bottom of the body 62 that align with the ears 52 to receive a pin 68 to pivotally couple the catch 50 to the striker frame 18, and a second pair of ears 70 projecting from a top of the body 62 for receiving a roller 72 rotatable about a pin 74. A resilient member 76, such as a torsion spring, may be positioned between the ears 52 around the pin 68 to bias the catch 50 in a latched position shown in FIG. 5.

The release shaft 54 includes a first portion 80 configured to abut the catch 50 to prevent movement of the catch 50 from the latched position, a second portion 82 have a diameter less than a diameter the first portion 80, a third portion 84 have a diameter greater than the diameter of second portion 82, and a fourth portion 86 having a diameter less than the diameter of the third portion 84. A resilient member 88, such as a compression spring, surrounds the fourth portion 86 to bias the release shaft 54 in the latched position.

The release lever 58 is pivotally coupled to the striker frame 18 by a pin 92 and includes an arm 90 movable by a user, and a pair of spaced legs 94 projecting from the arm 90 to receive the second portion 82 of the release shaft and abut the third portion 84 to hold the release shaft 54 in the latched position. When the arm 90 is moved downward, the legs 94 are moved upward compressing the resilient member 88 and moving the first portion 80 upward away from the catch 50. The catch 50 can then pivot about the pin 68 to allow the delay latch assembly 22 to be released from the striker assembly 20 without actuation of the latch assembly as described below.

Turning now to FIGS. 7-11 in addition to FIGS. 1 and 2, the latch assembly 22 is shown in detail. The door 12 may include a frame 100 having a cavity 102 for receiving the latch assembly 22, and a panel 104 coupled to the frame, although it will be appreciated that the door may have any suitable number of components. A latch support 106 and latch cover 108 may be coupled to the frame 100 at the cavity 102 to cover the latch assembly 22 while forming with the frame an opening 110 for accessing the latch assembly 22 from either side of the door 12. An indicator 112 may be coupled to the latch cover 108 to provide a visual indication, for example via a red/green color indication, to indicate whether the door is in the locked or unlocked position. It will be appreciated that the latch assembly may include two handles, one on either side of the door to operate in a similar manner as described herein.

The latch assembly 22 includes a housing 120 defining a cavity 122, a handle 124 extending through an opening 126 in the housing 120 with a first end 128 disposed in the cavity 122 and a second end 130 outside the cavity 122, a latch 132 disposed in the cavity 122, and a cover 134 coupled to the housing 120 to close the cavity 122, for example by fasteners. The housing 120 includes a projection 136 in the cavity 122 that serves as a spring seat and includes an opening 138. The cavity 122 opens to a front and side of the housing 120.

Figure 10:
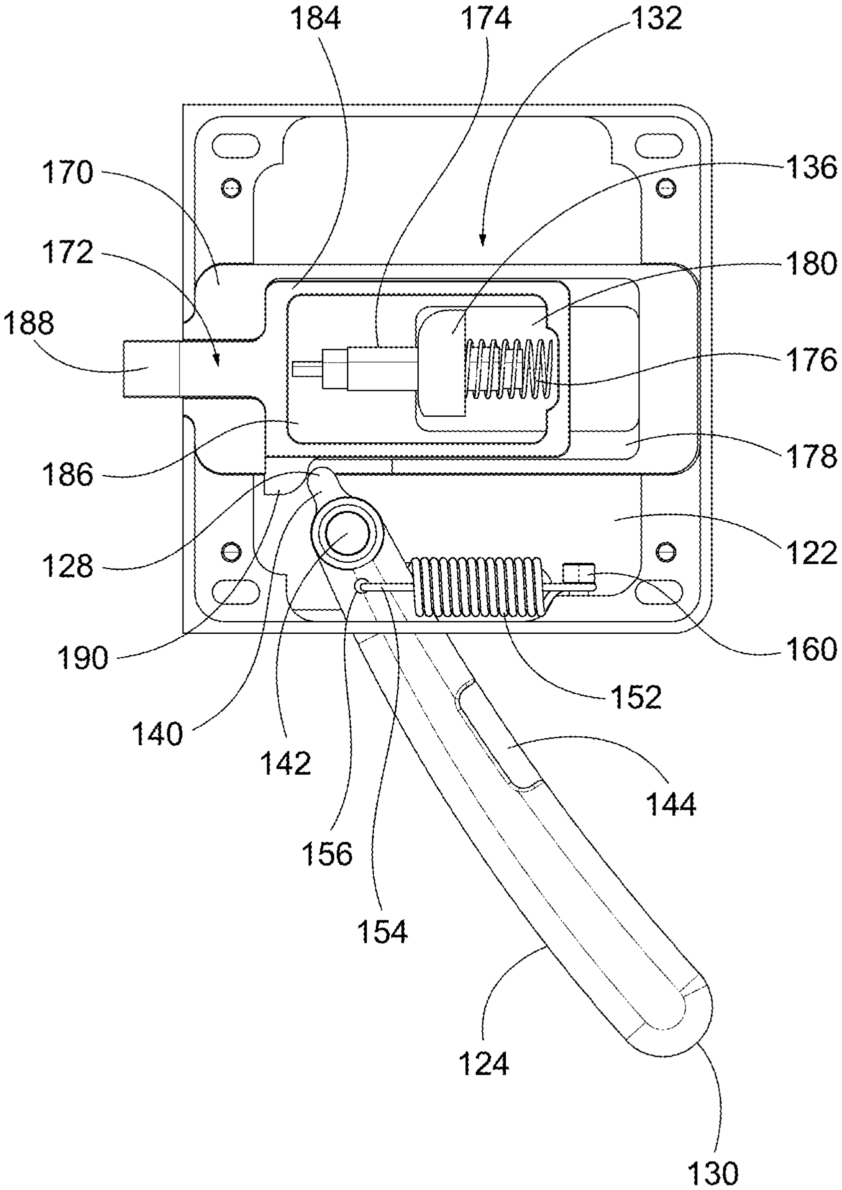
FIG. 10 is a side view of the latch assembly with a cover removed.
Figure 11:
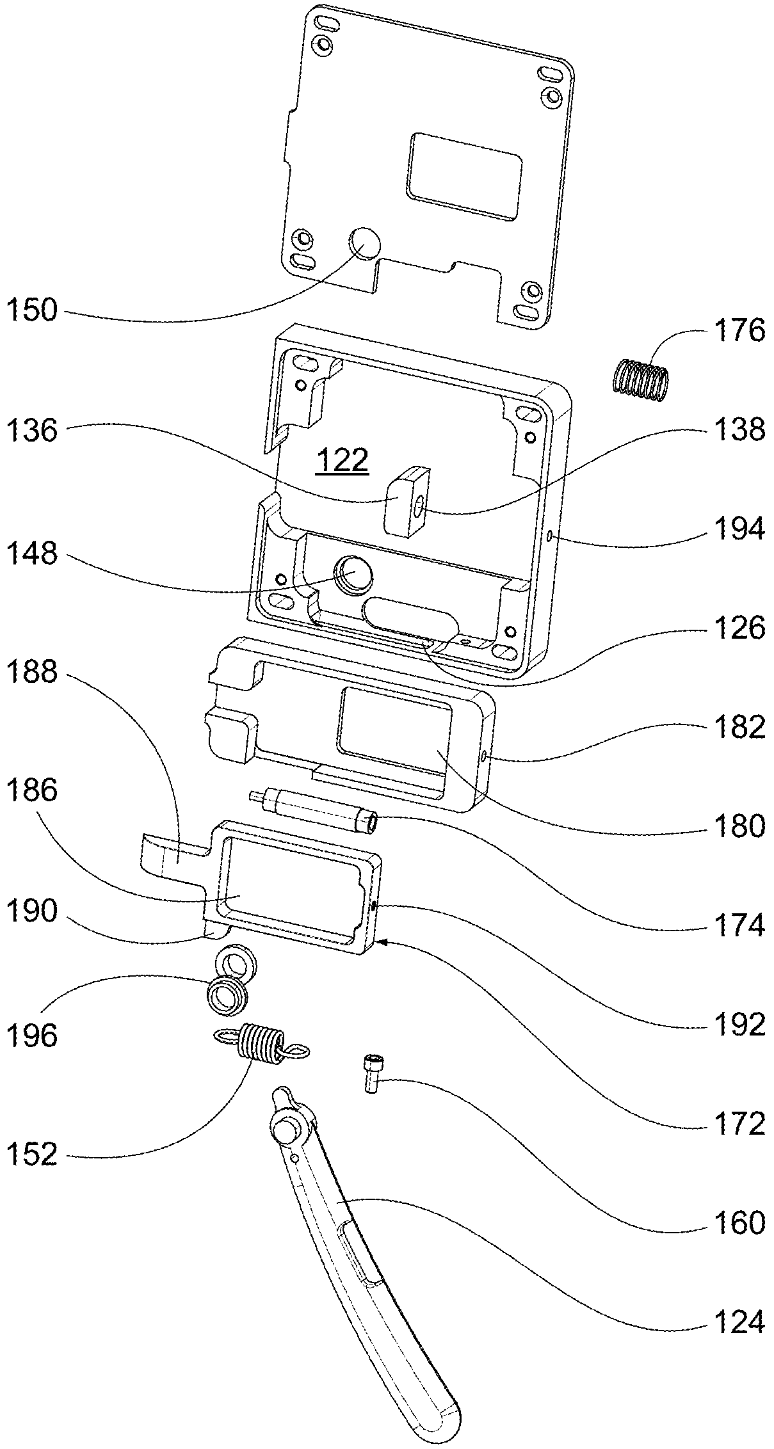
FIG. 11 is an exploded view of the latch assembly.

The handle 124 includes a cam arm 140 at the first end 128, a pair of outwardly extending ears 142 near the first end 128, and a notch 144 for engaging with the fixed latch 42. Each ear 142 receives a respective bushing 146, which is received in a respective opening 148, 150 in the housing 120 and cover 134 to hold the handle 124 in position while allowing the handle 124 to rotate relative to the housing 120 and cover 134. The handle 124 is held in the locked position by a resilient member 152, such as an extension spring that has a first end 154 that couples to the handle 124 via opening 156 in the handle 124 to pull the handle 124 in a counter-clockwise direction and a second end 158 that couples to a fastener 160 coupled to the housing 120 as shown in FIG. 10.

The latch 132 includes a guide 170 positioned in the cavity 122, a bolt 172 movable relative to the guide 170, a damping mechanism 174 abutting the bolt 172 and extending through the opening 138 in the projection 136 of the housing 120 and being coupled thereto, and a resilient member 176, such as a compression spring seated against the projection 136 and the bolt 172 or a plate abutting the bolt 172.

The guide 170 includes a cavity 178 openings to a side, front, and bottom of the guide 170 for receiving the bolt 172, damping mechanism 174, and resilient member 176, an opening 180 through which the projection 136 extends into the cavity 178, and an opening 182 for receiving an adjustment fastener to adjust the timing of the damping mechanism 174. The bolt 172 includes a body 184, an opening 186 that receives the damping mechanism 174 and the resilient member 176, a first projection 188 extending from a side of the body 184 through the side of the guide 170 and the side of the housing 120 for engaging with the catch 50, a second projection 190 extending from a bottom of the body 184 through the bottom of the guide 170 for engaging with the cam arm 140 on the handle 124, and an opening 192 in a back of the body 184 that aligns with the opening 182 and an opening 194 in the housing 120 for receiving the fastener for adjusting the damping mechanism 174.

The damping mechanism 174 may be a suitable timing mechanism to effect a delayed opening of the latch 132, such as a hydraulic timing mechanism. Damping mechanisms of various predetermined timings may be used to adjust the delay, or a user may adjust the adjustment fastener to move a plate seating the resilient member 176 to change the preload of the resilient member 176.

When the door 12 is closed, the first projection 188 of the bolt 172 is positioned between the striker frame 18 and the catch 50, with the catch 50 being held in the locked position by the release shaft 54. The handle 124 is biased in the closed position by the resilient member 152, and the cam arm 140 abuts the second projection 190 of the body 184 causing the body 184 to abut the guide 170 and hold the first projection 188 in the locked position. The force of the resilient member 152 is greater than the force of the resilient member 176 preventing the resilient member 176 from moving the bolt 172 without user intervention.

To unlock the door via the handle 124, a user rotates and holds the handle 124, which will move the cam arm 140 away from the second projection 190 and prevent the resilient member 152 from moving the handle back to the closed position. The resilient member 176 will then push the bolt 172 which will cause the bolt to push against the damping mechanism 174 to start compressing the damping mechanism 174. After the predetermined time, the damping mechanism 174 will have compressed enough to allow the resilient member 176 to move the bolt 172 away from between the striker frame 18 and catch 50 to allow the door 12 to open.

To unlock the door via the release lever 58, a user moves the arm 90 downward, which will move the legs 94 upward compressing the resilient member 88 and moving the first portion 80 of the release shaft 54 away from the catch 50. The catch 50 can then pivot downward about the pin 68 by movement of the first projection 188 against the catch 50 when the door 12 is moved to allow the door to open. The resilient member 76 can then move the catch 50 back to is locked position once the first projection 188 is clear of the catch 50.

Once the door 12 is opened, the door 12 can be moved toward the stowage assembly. The angled surface of the second portion 48 will contact the handle 124 and rotate the handle until the notch 144 on the handle 124 engages with an underside of the second portion 48 to hold the door in an open position. The movable latch 44 can then be rotated to engage the latch assembly 22 to provide a secondary latch.

When the handle 124 is released, the resilient member 152 will move the handle back to its first position where the cam arm 140 will move the second projection 190 and thus the bolt 172 to the locked position allowing the damping mechanism 174 to be released and decompressed.

Figure 12:
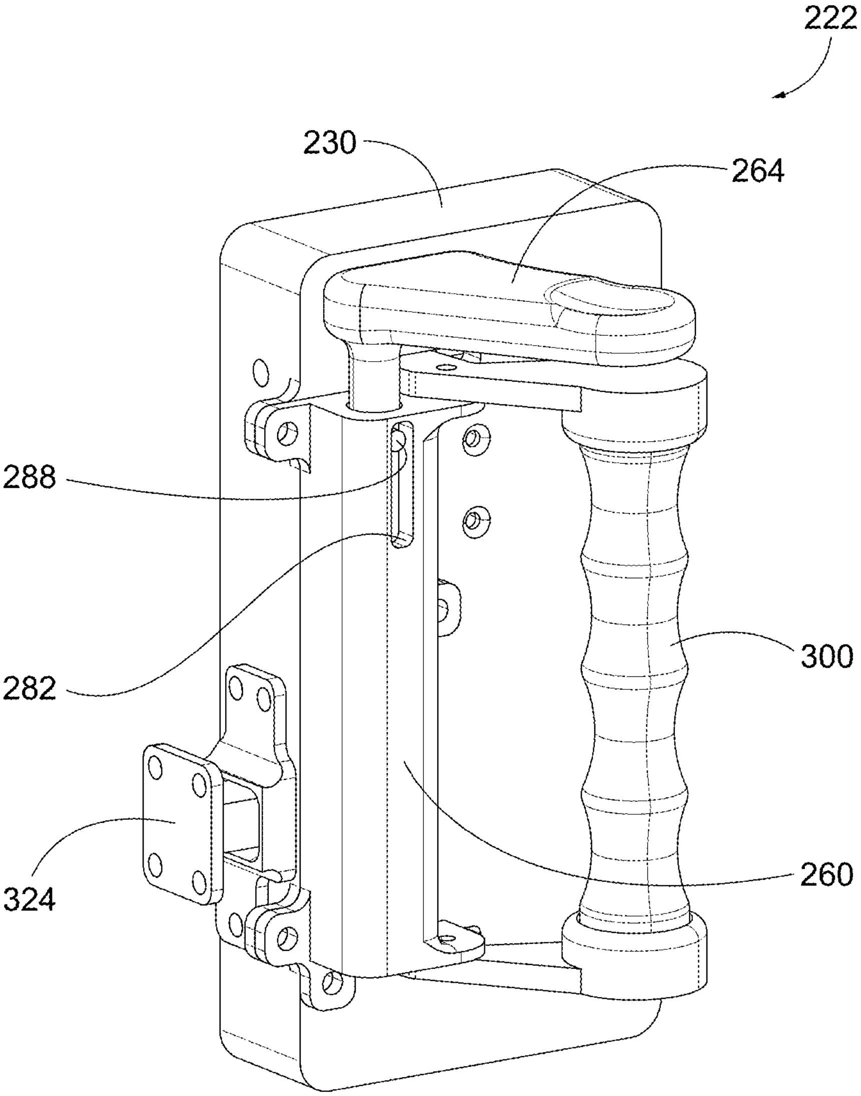
FIG. 12 is a perspective view of another exemplary latch assembly.
Figure 13:
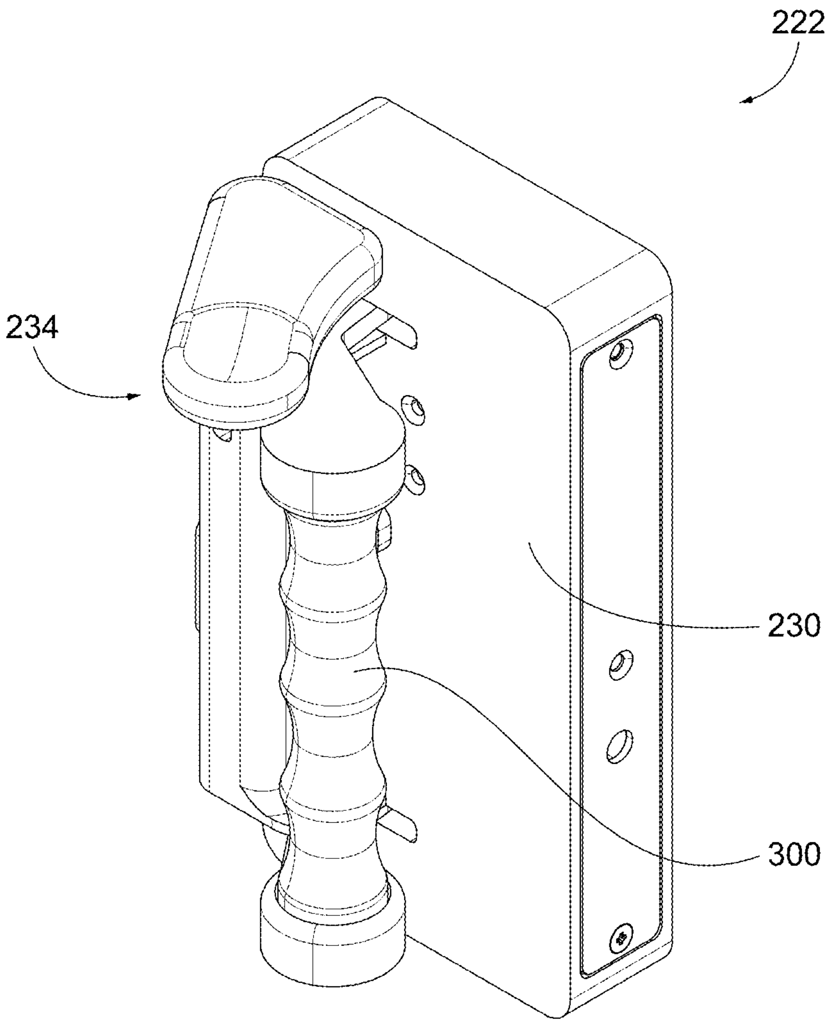
FIG. 13 is another perspective view of the latch assembly.
Figure 14:
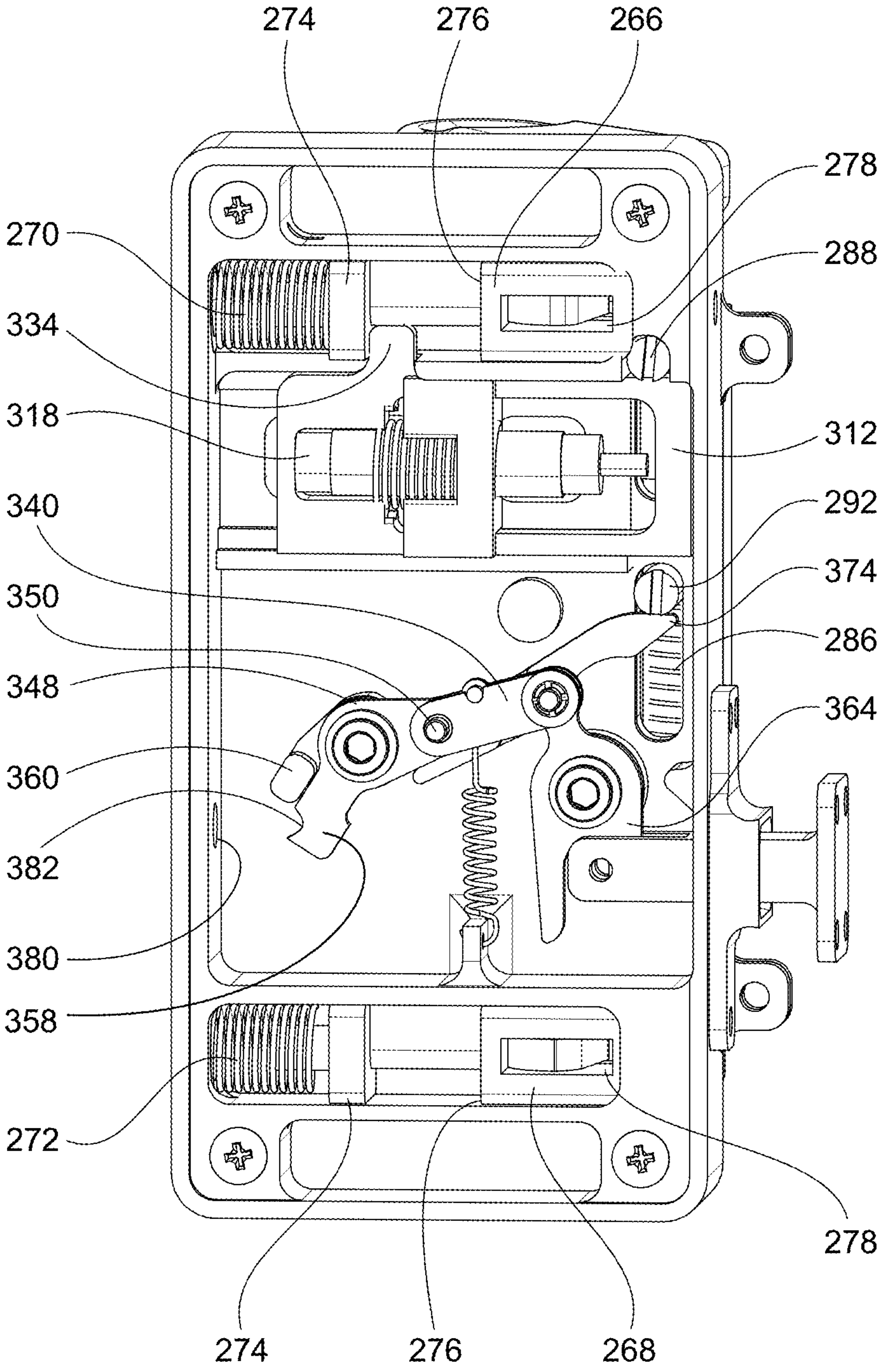
FIG. 14 is a back view of the latch assembly in a locked position with a cover removed.

Turning now to FIGS. 12-14, an exemplary embodiment of the latch assembly is shown at 222. The latch assembly 222 is configured to attach to a sliding door to provide a delayed opening of a sliding door. The foregoing description of the latch assembly 22 is applicable to the latch assembly 222 except as noted below.

The latch assembly 222 includes a housing 230 defining a first cavity 232, a handle assembly 234 coupled to the housing 230, a latch 236 disposed in the first cavity 232, and a cover 238 coupled to the housing 230 to close the first cavity 232, for example by fasteners.

Figure 15:
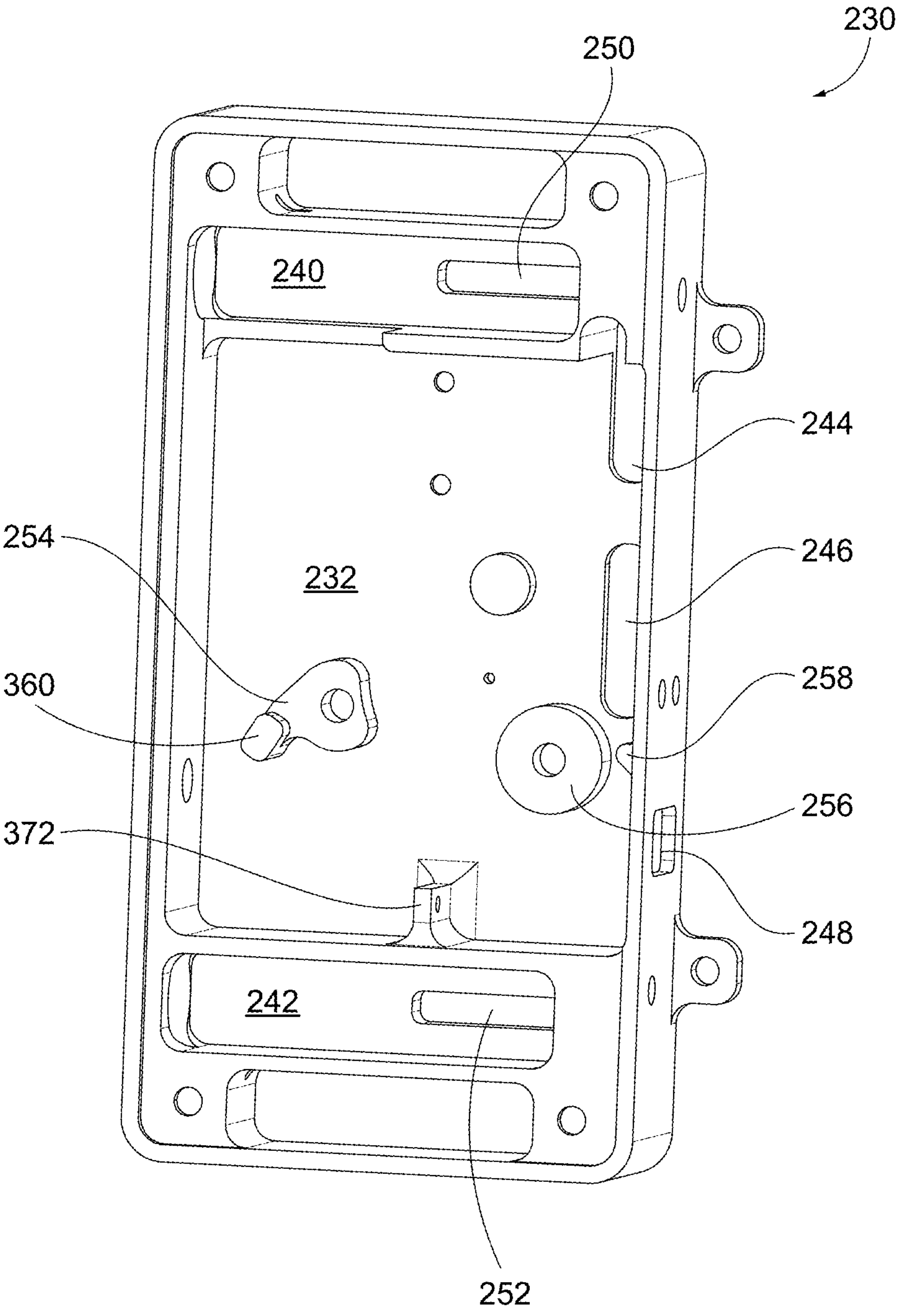
FIG. 15 is a perspective view of a housing of the latch assembly.

Turning additionally to FIG. 15, the housing 230 also includes second and third cavities 240 and 242 for receiving parts of the handle assembly 234, first and second openings 244 and 246 opening to the first cavity 232 from a front of the housing, a third opening 248 opening to the first cavity 232 from a side of the housing 230, fourth and fifth openings 250 and 252 opening to second and third cavities 240 and 242 respectively, first and second projections 254 and 256 in the first cavity 232, and a projection 258 projecting from a side of the housing 230 into the first cavity 232.

Figure 16:
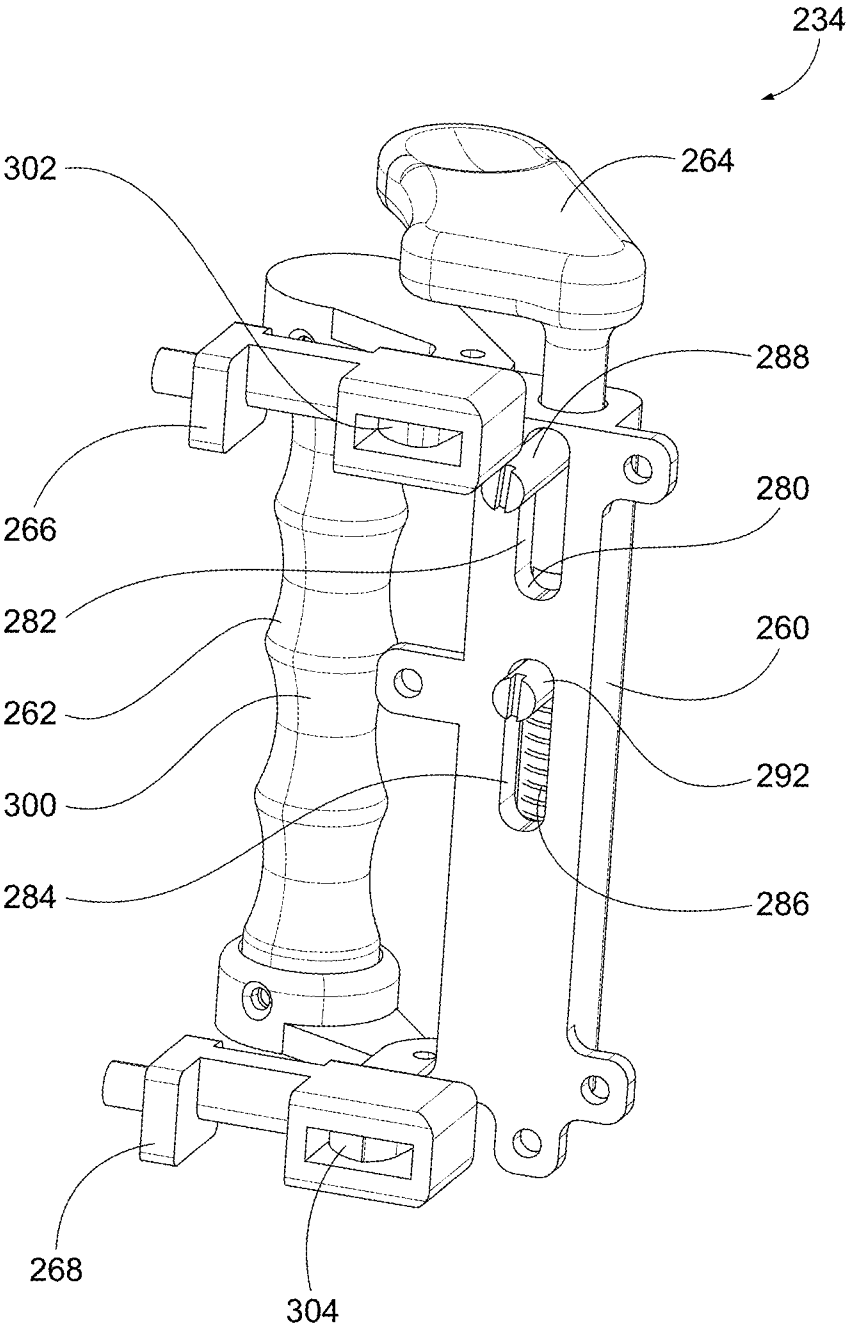
FIG. 16 is a perspective view of a handle assembly of the latch assembly.

Turning additionally to FIG. 16, the handle assembly 234 includes a base 260 coupled to the housing 230, a handle 262 pivotally coupled to the base 260, a release shaft 264 movable relative to the base 260, and first and second handle shafts 266 and 268 disposed in the second and third cavities 240 and 242 and biased in a locked position by respective resilient members 270 and 272, such as compression springs. Each handle shaft 266, 268 has a first shoulder 274, a second shoulder 276, and an opening 278. The first shoulder 274 of the handle shaft 266 abuts a part of the latch 236 in the locked position and the second shoulder 276 of the handle shaft 266 moves the part of the latch 236 to an unlocked position as will be described below.

The base 260 includes a passage 280 for receiving the release shaft 264, an opening 282 opening to the passage 280 from the front and back of the base 260, and an opening 284 opening to the passage 280 from the back of the base 260. The release shaft 264 is received in the passage 280 and biased in an upward position by a resilient member 286, such as a compression spring. A first pin 288 extends through an opening in the release shaft 264 to move along the opening 282 and the first opening 244 in the housing 230 and a second pin 292 extends through an opening in the release shaft 264 to move along the opening 284 and the second opening 246 in the housing 230 when the release shaft 264 is moved to a downward position.

The handle 262 includes a body 300 for a user to grip, and first and second arms 302 and 304 extending from opposite sides of the body 300. The first and second arms 302 and 304 extending through the fourth and fifth openings 250 and 252 respectively and into the respective opening 278 in the handle shaft 266, 268 for moving the handle shafts 266 and 268.

Figure 17:
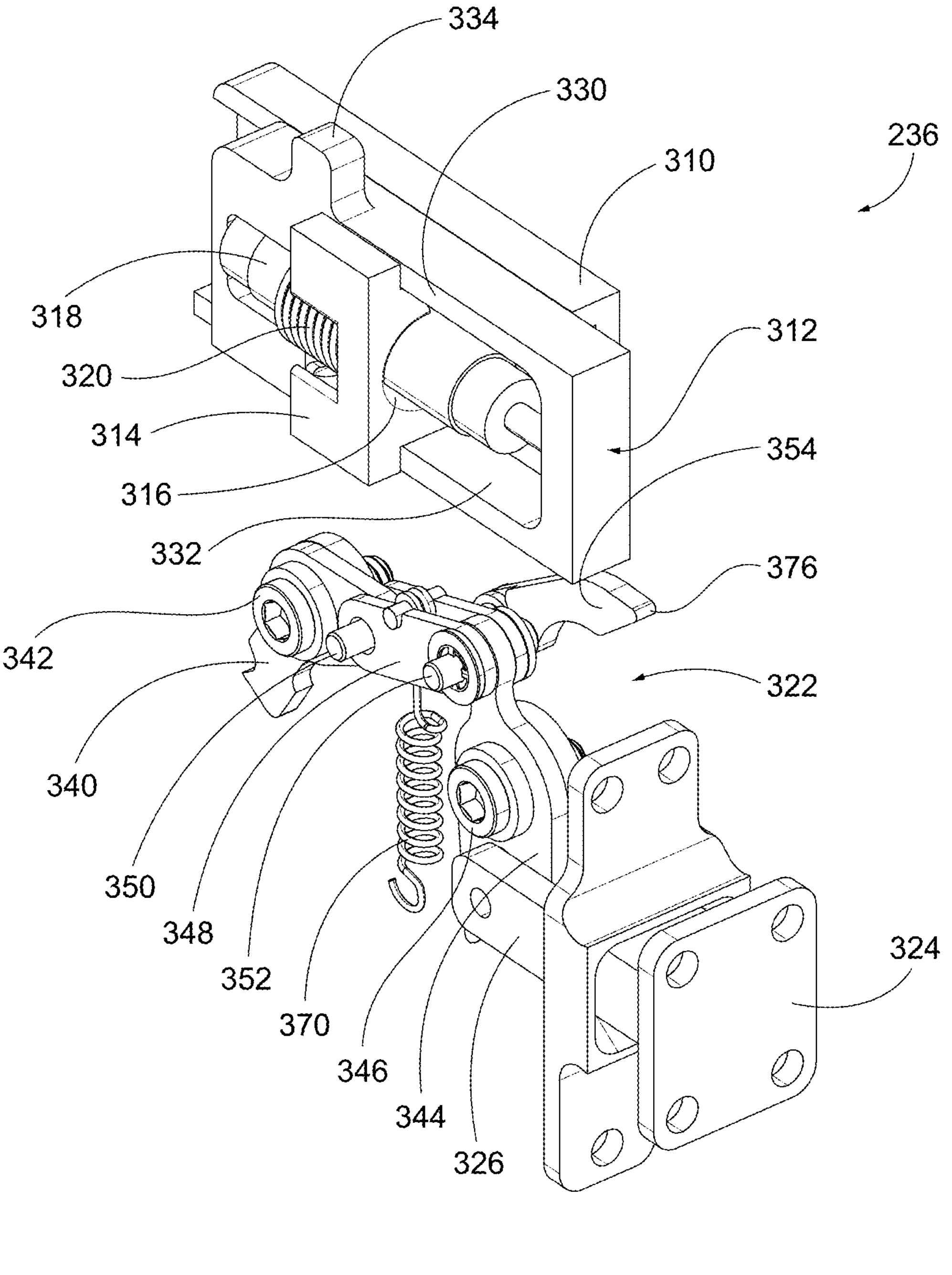
FIG. 17 is a perspective view of a latch of the latch assembly.
Figure 18:
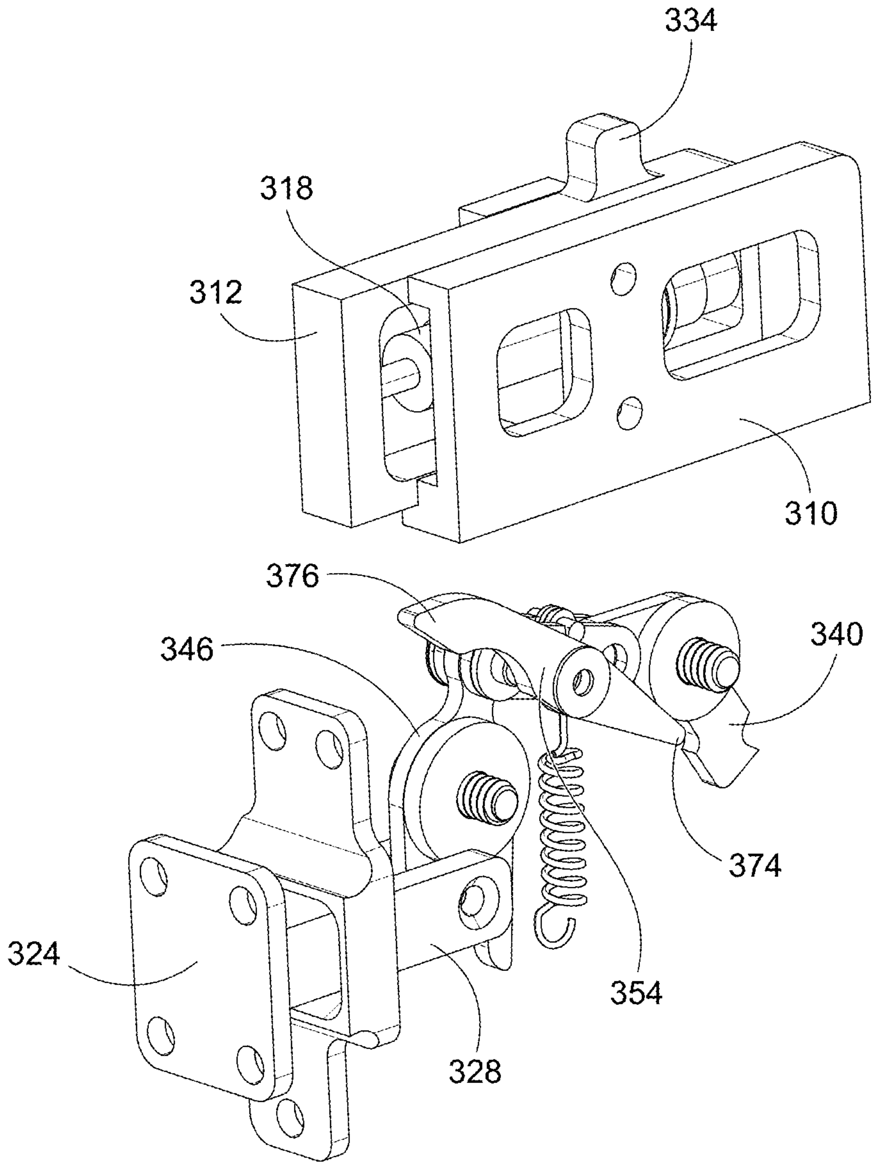
FIG. 18 is another perspective view of the latch.

Turning additionally to FIGS. 17 and 18, the latch 236 includes a guide 310 positioned in the first cavity 232, a lock bar 312 movable relative to the guide 310, a seat 314 coupled to the guide 310 and having an opening 316, a damping mechanism 318 abutting the lock bar 312 and extending through the opening 316 in the seat 314 and being coupled thereto, a resilient member 320 such as a compression spring seated against the seat 314 and the lock bar 312, an overcenter assembly 322, and a bracket 324 configured to couple to a wall of the aircraft and to extend through the third opening 248 in the housing 230. The bracket 324 includes first and second spaced legs 326 and 328 that receive a pin or is integrally formed with the pin.

The guide 310 defines a track for the lock bar 312 to move side-to-side and is coupled to the housing 230 in a suitable manner, such as by fasteners. The lock bar 312 includes a body 330, an opening 332 that receives the seat 314, damping mechanism 318 and resilient member 320, and a projection 334 extending from a top of the body 330 into the second cavity 240 to be moved by the first and second shoulder 274 and 276 of the handle shaft 266. The damping mechanism 318 may be a suitable timing mechanism to effect a delayed opening of the latch 236, such as a hydraulic timing mechanism. Damping mechanisms of various predetermined timings may be used to adjust the delay, or a user may change the preload of the resilient member 320.

The overcenter assembly 322 includes a cam lock 340 coupled to the first projection 254 by a fastener 342, a striker 344 coupled to the second projection 256 by a fastener 346, a pair of links 348 coupled to the cam lock 340 and striker 344 by first and second pins 350 and 352 respectively, and a crank 354 coupled to the housing 230 by a fastener 356.

The cam lock 340 is configured to rotate about the fastener 342 and includes a leg 358 configured to abut a stop

360 on the first projection 254 in the locked position. The striker 344 is configured to rotate about the fastener 346 and includes first and second legs 362 and 364 spaced from one another to define an area for receiving the pin (not shown) coupled to the first and second legs 326 and 328 of the bracket 324. The first leg 362 is longer than the second leg 364, and the second leg 364 is configured to serve as a stop to hold the bracket 324 in the housing 230 in the locked position. Each link 348 includes a notch 366 that receives a pivot 368 coupled to a resilient member 370 such as a tension spring that is coupled to a projection 372 in the first cavity 232. The crank 354 has a first end 374 that abuts the second pin 292 and a second end 376 that abuts the first pin 350.

In the locked position shown in FIG. 14, the first shoulder 274 of the handle shaft 266 is abutting the projection 334 on the lock bar 312 thereby holding the lock bar 312 in a first position abutting the first pin 288 to hold the release shaft 264 in the upward position. In this position, the striker 344 is in a downward position where the second leg 364 is abutted by the pin on the bracket 324 preventing the release of the bracket 324 and rotation of the striker 344.

Figure 19:
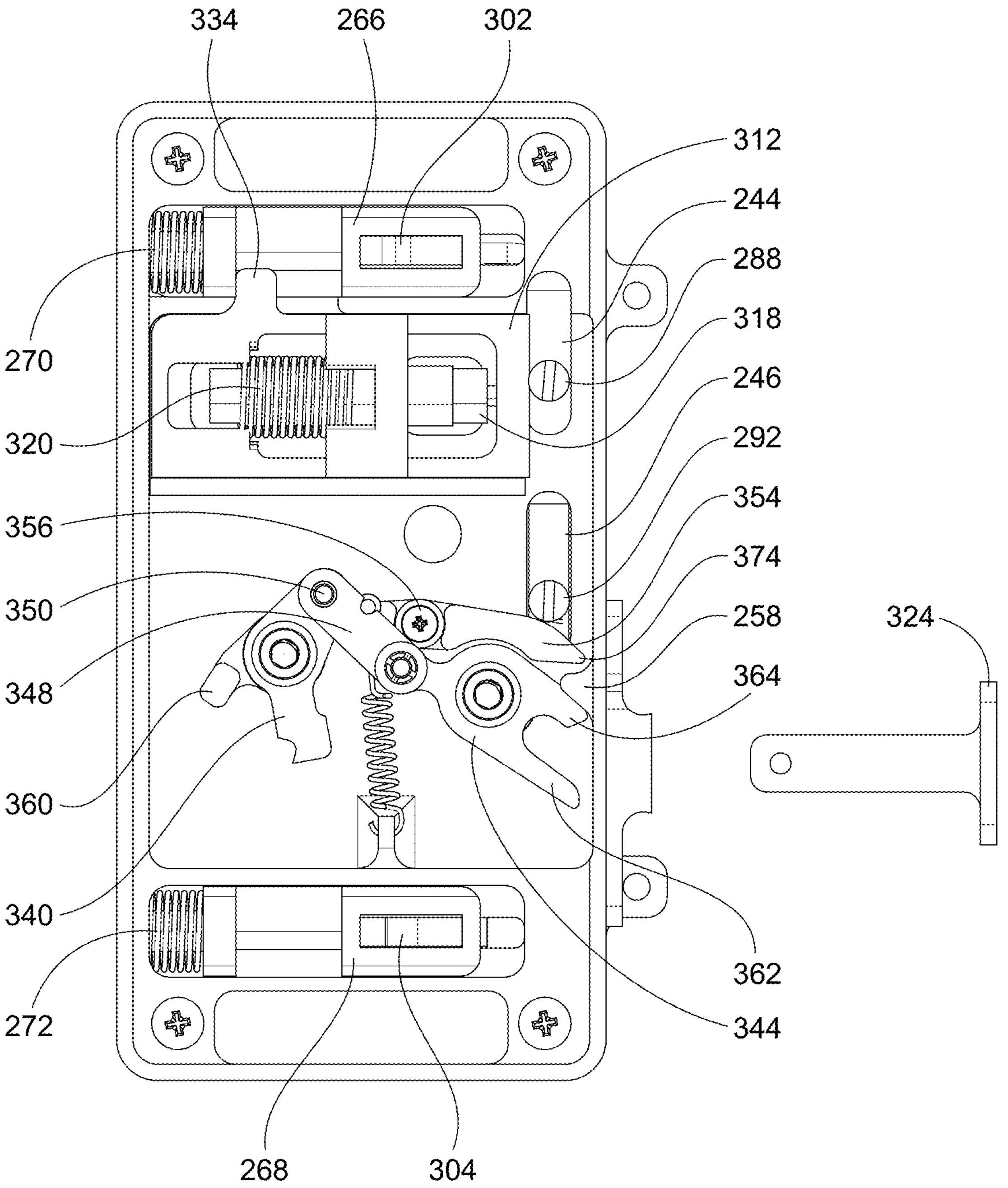
FIG. 19 is a back view of the latch assembly in an unlocked position with the cover removed.

To move the latch assembly 222 to the unlocked position shown in FIG. 19, the user pulls the handle toward them to rotate the body 300 of the handle 262 to move the first and second arms 302 and 304 in a direction away from the bracket 324. The movement of the first and second arms 302 and 304 moves the handle shafts 266 and 268 against the resilient member 270 and 272 and away from the projection 334. The resilient member 320 will then push the lock bar 312 which will cause the lock bar 312 to push against the damping mechanism 318 to start compressing the damping mechanism 318. After the predetermined time, the damping mechanism 318 will have compressed enough to allow the resilient member 320 to move the lock bar 312 to a second position away from the first pin 288 and the first opening 244.

Once the lock bar 312 is in the second position, the release shaft 264 can be moved to the downward position thereby moving the first and second pins 288 and 292 downward along the first and second openings 244 and 246. In this position, the first pin 288 will prevent the lock bar 312 from moving to the first position and the second pin 292 will push the first end 374 of the crank 354 downward. The downward movement of the first end 374 of the crank will cause the crank 354 to rotate about the fastener 356 to move the second end 376 of the crank upward. The upward movement will cause the second end 376 of the crank 354 to move the first pin 350 upward, thereby rotating the cam lock 340 away from the stop 360 and rotating the striker 344 to an upward position to move the second leg 364 upward to abut the projection 258. This will release the pin in the bracket 324 to allow the door to be opened away from the bracket 324.

To relock the door, the release shaft 264 is released by the user allowing the resilient member 286 to move the release shaft 264 and the pins 288 and 292 upward, thereby allowing the resilient members 270 and 272 to move the lock bar 312 to the first position. When the door is moved toward the bracket 324, the bracket 324 is advanced through the opening 248 to contact the first leg 362 of the striker 344. Continued advancement of the bracket 324 rotates the striker 344 to the downward position, which moves the links 348 to move the cam lock 340 to abut the stop 360 and moves the first pin 350 downward which rotates the crank 354 to move the first end 374 upward abutting the second pin 292.

If the latch 236 is jammed, a user may insert a pin or the like into opening 380 in the housing 230 to contact a notch 382 in the leg 358 of the cam lock 340 and advance the pin toward the bracket 324 to rotate the cam lock 340, thereby moving the links 348 to rotate the striker 344 to the unlocked position shown in FIG. 19.

Figure 20:
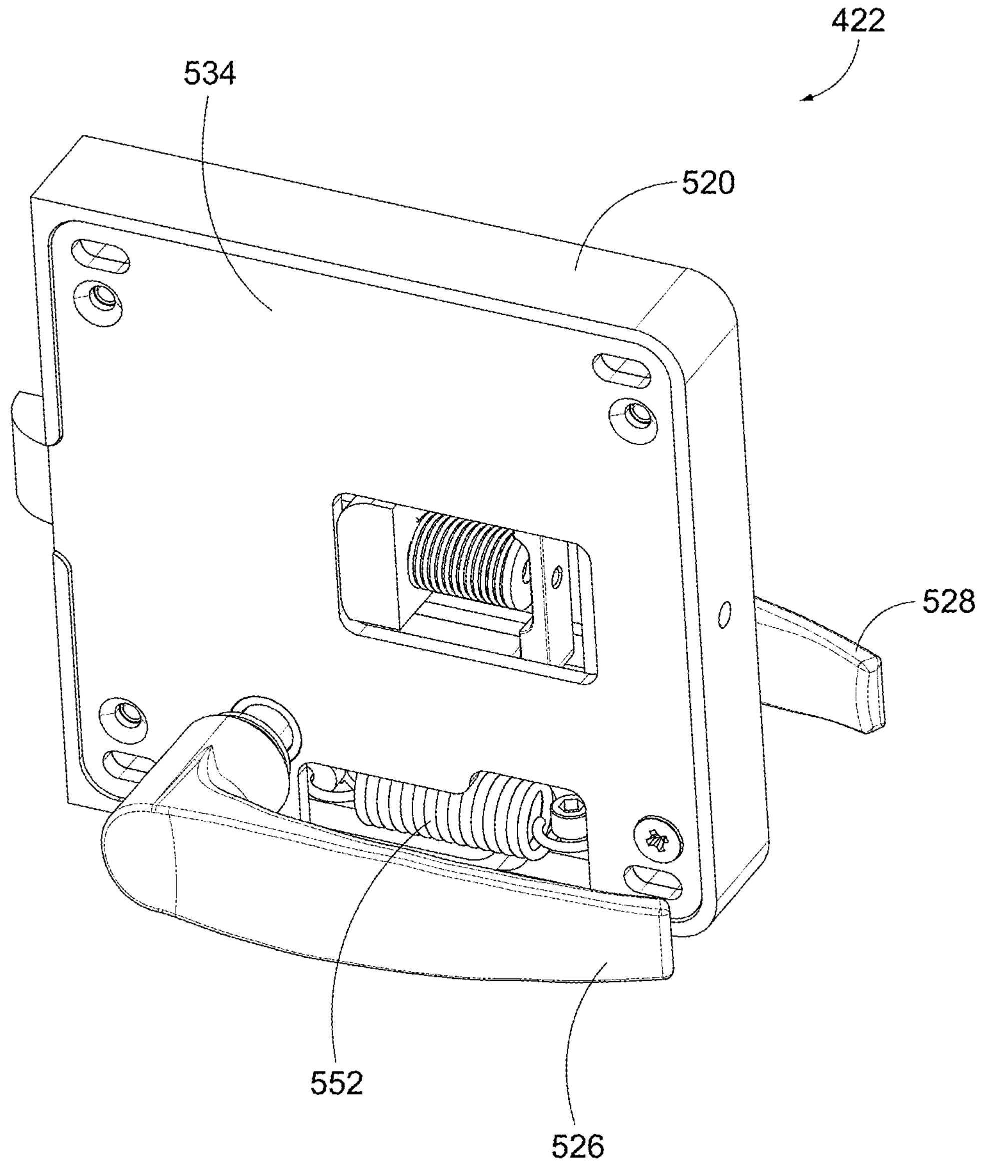
FIG. 20 is a perspective view of still another exemplary latch assembly.
Figure 21:
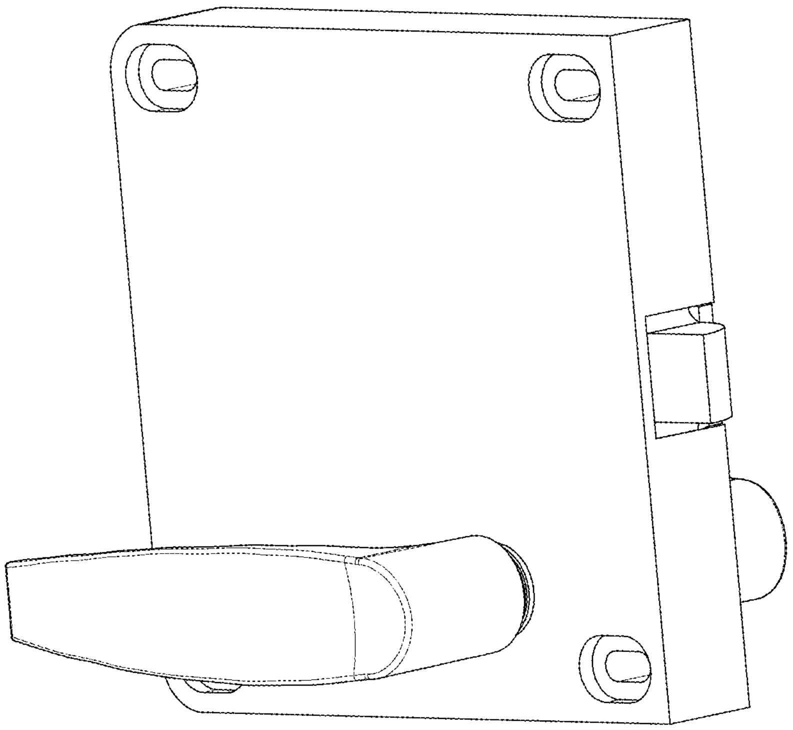
FIG. 21 is another perspective view of the latch assembly.
Figure 22:
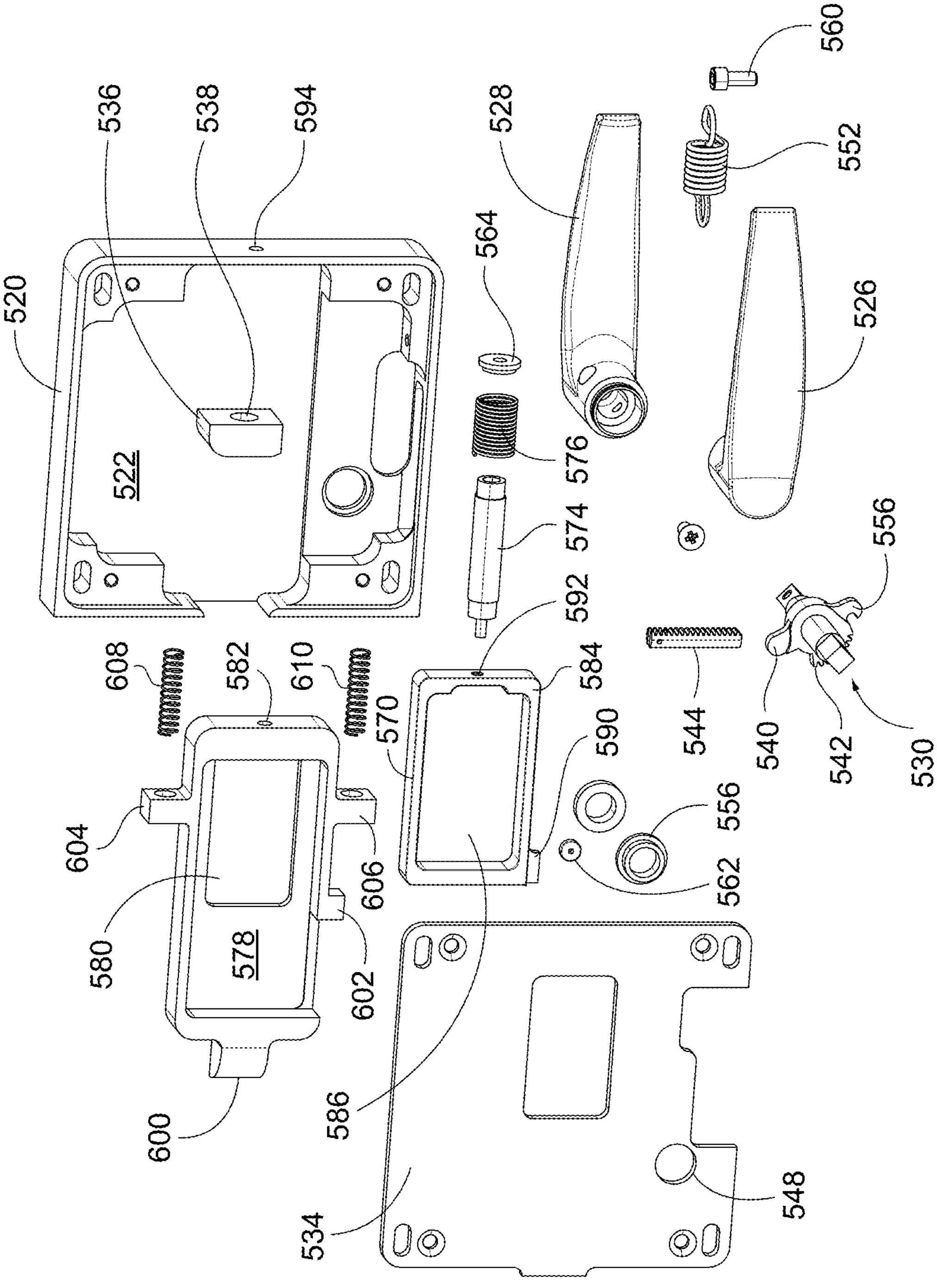
FIG. 22 is an exploded view of the latch assembly.

Turning now to FIGS. 20-22, an exemplary embodiment of the latch assembly is shown at 422. The latch assembly 422 is substantially the same as the above-referenced latch assembly 22, and consequently the same reference numerals but indexed by 400 are used to denote structures corresponding to similar structures in the latch assemblies. In addition, the foregoing description of the latch assembly 22 is equally applicable to the latch assembly 422 except as noted below.

The latch assembly 422 includes a housing 520 defining a cavity 522, a handle assembly 524 rotationally coupled to the housing 520, a latch 532 disposed in the cavity 522, and a cover 534 coupled to the housing 520 to close the cavity 522, for example by fasteners. The housing 520 includes a projection 536 in the cavity 522 that serves as a spring seat and includes an opening 538.

The handle assembly 524 includes first and second handles 526 and 528, a cam shaft 530 extending through openings 548 and 550 in the housing 520 and cover 534, and a rack 544 disposed in the cavity 522. Each end of the cam shaft 530 receives a respective bushing 546 that is received in the respective opening 548 and 550. The cam shaft 530 includes a cam arm 540, a pinion portion 542, and a hook 556. The pinion portion 542 is curved to extend around a portion of the cam shaft 530 and the rack 544 is coupled to a wheel 562 by a pin to roll on a surface of the latch 532. The handle assembly 524 is held in the locked position by a resilient member 552, such as an extension spring that has a first end 554 that couples to the cam shaft 530 at the hook 556 to pull the handle assembly 524 in a counterclockwise direction and a second end 558 that couples to a fastener 560 coupled to the housing 520.

The latch 532 includes a timing block 570 positioned in the cavity 522, a bolt 572 positioned in the cavity 522 surrounding the timing block 570, a damping mechanism 574 abutting the timing block 570 and extending through the opening 538 in the projection 536 of the housing 520 and being coupled thereto, and a resilient member 576, such as a compression spring seated against the projection 536 and the timing block 570 or a plate 564 abutting the timing block 570.

The bolt 572 includes a cavity 578 openings to a front and bottom of the bolt 572 for receiving the timing block 570, damping mechanism 574, and resilient member 576, an opening 580 through which the projection 536 extends into the cavity 578, and an opening 582 for receiving an adjustment fastener to adjust the timing of the damping mechanism 574. The bolt 572 also includes a first projection 600 extending from a side of the bolt 572 and through the housing 520 for engaging a catch, a second projection 602 extending from a bottom of the bolt 572 for engaging with the cam arm 540, and third and fourth projections 604 and 606 extending in opposite directions from the top and bottom of the bolt 572. The third and fourth projections 604 and 606 serve as seats along with the housing 520 for respective resilient members 608 and 610, such as compression springs biasing the bolt 572 in the locked position.

The timing block 570 includes a body 584, an opening 586 that receives the damping mechanism 574 and the resilient member 576, a projection 590 extending from a bottom of the body 584 through the bottom of the bolt 572 for engaging with the cam arm 540 on the handle assembly 524, and an opening 592 in a back of the body 584 that aligns with the opening 582 and an opening 594 in the housing 520 for receiving the fastener for adjusting the damping mechanism 574.

The damping mechanism 574 may be a suitable timing mechanism to effect a delayed opening of the latch 532, such as a hydraulic timing mechanism. Damping mechanisms of various predetermined timings may be used to adjust the delay, or a user may adjust the adjustment fastener to move the plate 564 seating the resilient member 576 to change the preload of the resilient member 576.

When the door is closed, the first projection 600 of the bolt 572 is positioned between the striker frame and the catch and the resilient members 608 and 610 hold the bolt 572 in the locked position. The handle assembly 524 is biased in the closed position by the resilient member 552, and the cam arm 540 abuts the projection 590 of the body 584 preventing the timing block 570 from compressing the damping mechanism 574 and holding the timing block 570 in a first position. The force of the resilient member 552 is greater than the force of the resilient member 576 preventing the resilient member 576 from moving the timing block 570 without user intervention.

Figure 23:
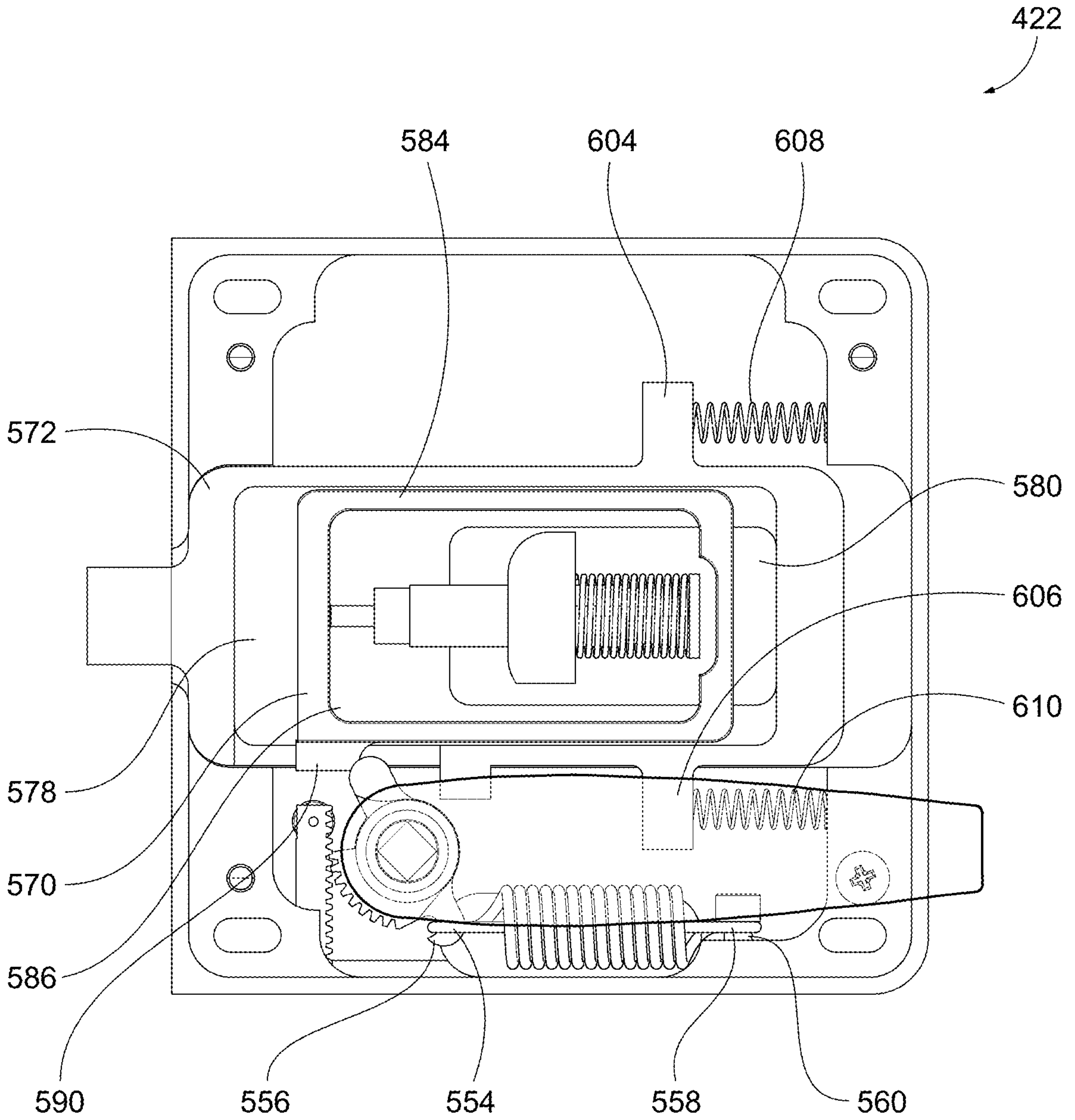
FIG. 23 is a side view of the latch assembly in a locked position with a cover removed.
Figure 24:
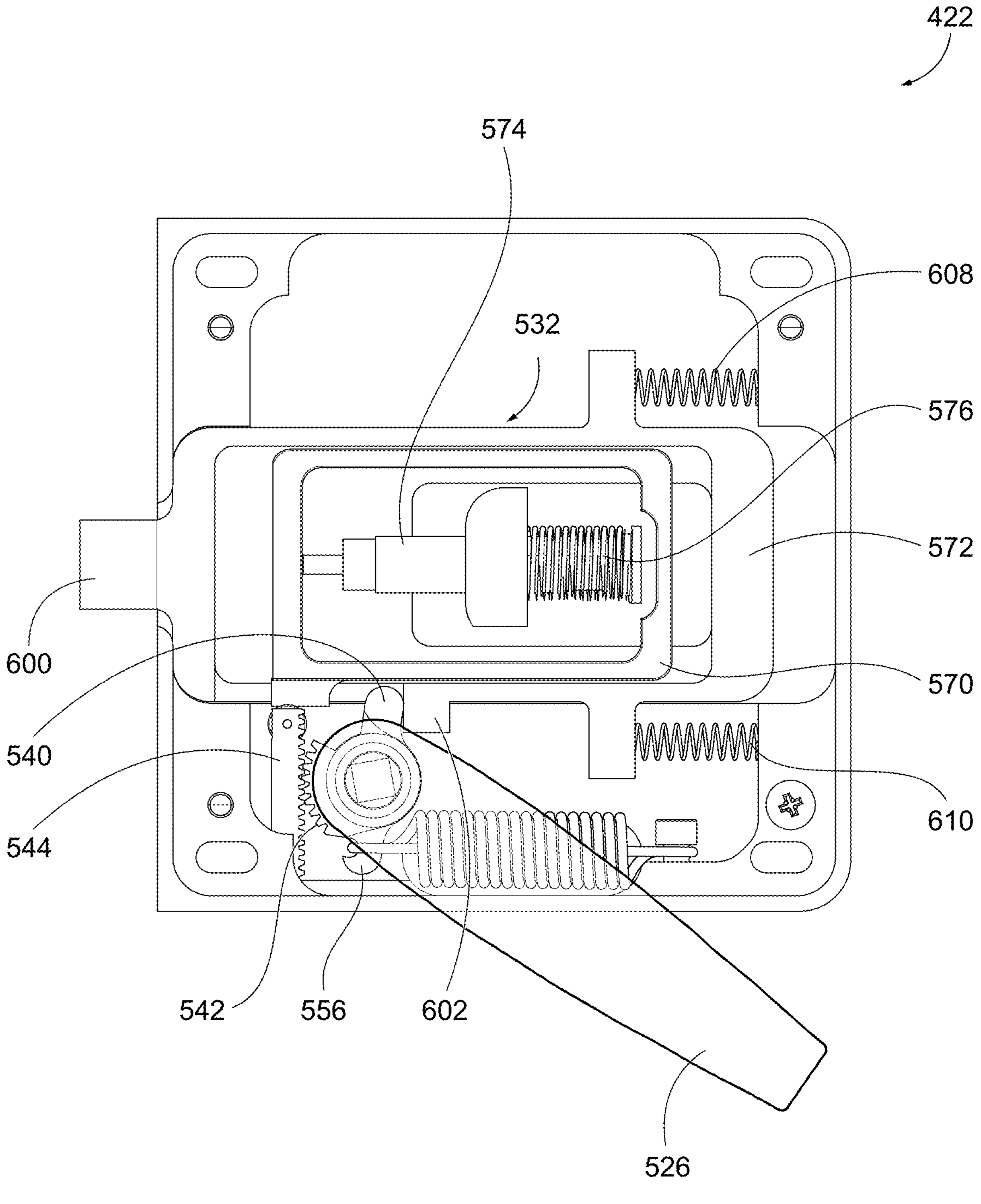
FIG. 24 is a side view of the latch assembly in an intermediate locked position with the cover removed.
Figure 25:
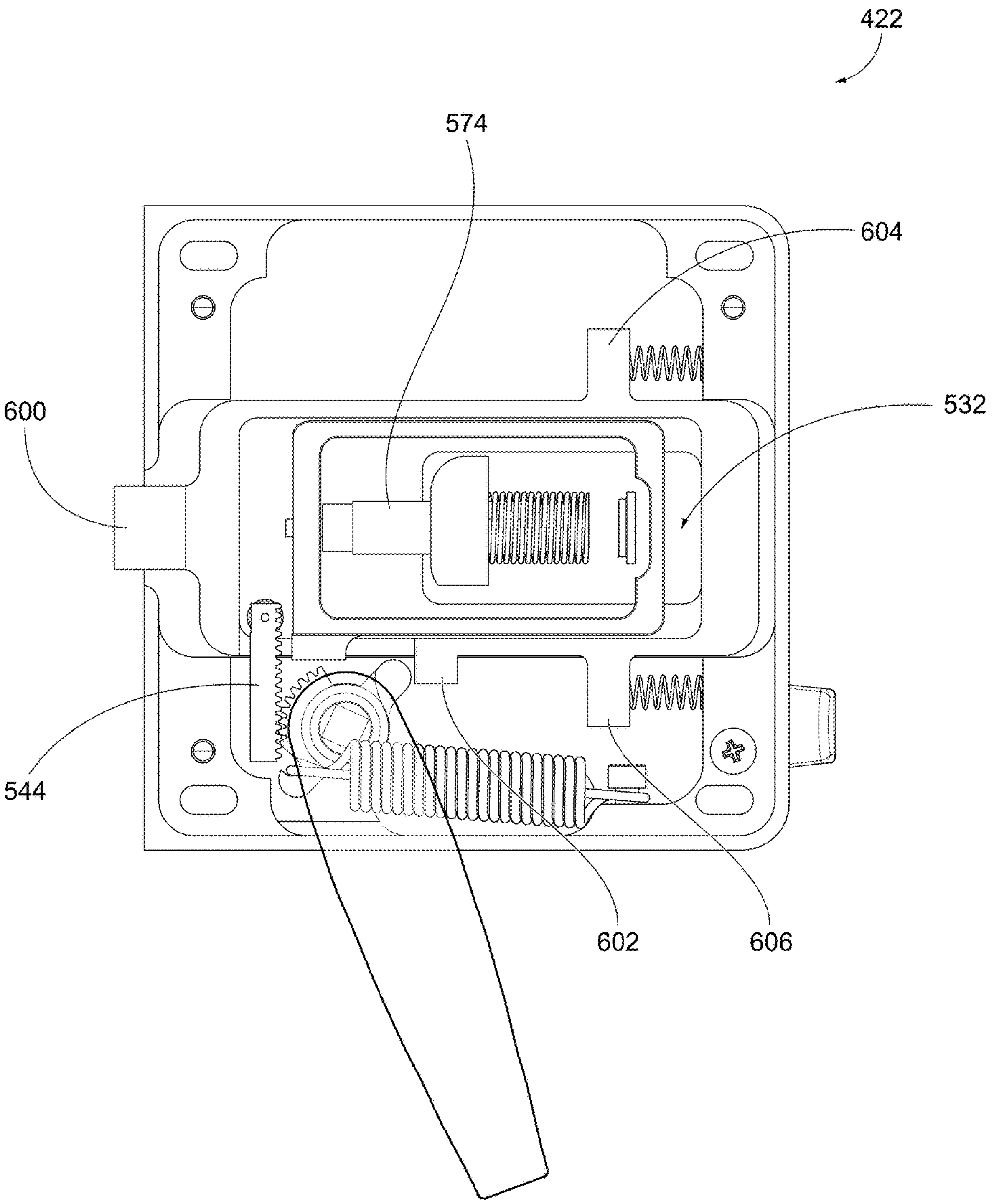
FIG. 25 is a side view of the latch assembly in an unlocked position with the cover removed.

Turning now to FIGS. 23-25, operation of the latch assembly 222 will be described, where the handle 526 is shown as transparent and the cover 534 is removed. To unlock the door via the handle assembly 524, a user rotates and holds one of the first and second handles 526 and 528 from a first position shown in FIG. 23 to a second position shown in FIG. 24 where the assembly is in an intermediate position. Rotation of the handle 526/528 will move the cam arm 540 away from the projection 590 of the timing block 570 to abut the second projection 602 on the bolt 572 and prevent the resilient member 552 from moving the handle back to the closed position. The rotation of the handle 526/528 will also move the rack 544 upward and the wheel 562 will contact a bottom of the projection 590 which prevents further rotation of the first handle 526 or the second handle 528.

The resilient member 576 will then push the timing block 570 which will cause the timing block 570 to push against the damping mechanism 574 to start compressing the damping mechanism 574. After the predetermined time, the damping mechanism 574 will have compressed enough to allow the resilient member 576 to move the timing block 570 to a second position away from the rack 544 as shown in FIG. 25.

Once the damping mechanism 574 has compressed, the rack 544 will be unblocked by the projection 590 and the user can move the handle 526/528 to a third position shown in FIG. 25. The further rotation of the handle 526/528 will cause the cam arm 540 to move the second projection 602 to the unlocked position to move the first projection 600 away from between the striker frame and catch to allow the door to open. While the user is holding the handle 526/528 in the third position, the rack 544 prevents the damping mechanism 574 from decompressing. When the handle 526/528 is released, the resilient member 608 and 610 will push against the third and fourth projections 604 and 606 causing the bolt 572 to slam closed. The resilient member 552 will move the handles 526 and 528 back to their first position where the pinion portion 542 retracts the rack 544 and the cam arm 540 will move the projection 590 and thus the timing block 570 to the first position allowing the damping mechanism 574 to be released and decompressed.

Although certain embodiments have been shown and described, it is understood that equivalents and modifications falling within the scope of the appended claims will occur to others who are skilled in the art upon the reading and understanding of this specification.

What is claimed is:

1. A latch assembly including:

a housing defining a cavity and including a projection in the cavity;

a handle movable relative to the housing;

a latch disposed in the cavity, the latch having a bolt movable between a locked and an unlocked position and a damping mechanism for delaying movement of the bolt from the locked position to the unlocked position for a predetermined amount of time;

a cam shaft including a cam arm, a pinion portion, and a hook; and a rack coupled to a wheel by a pin to roll on the surface of the latch, wherein the handle is biased in a first position abutting the bolt to hold the bolt in the locked position, and the handle is movable to a second position away from the bolt allowing for movement of the bolt to the unlocked position.

2. The latch assembly according to claim 1, wherein the bolt includes a body, a first projection extending from the body configured to contact a striker frame in the locked position, and a second projection extending from the body abutted by the cam arm in the locked position.

3. The latch assembly according to claim 1, further including a resilient member biasing the handle in the first position.

4. The latch assembly according to claim 3, wherein the resilient member is an extension spring having a first end coupled to the housing and a second end coupled to the handle.

5. The latch assembly according to claim 3, further including a second resilient member biasing the bolt in the unlocked position, wherein a force of the resilient member is greater than a force of the second resilient member such that the second resilient member will not move the bolt toward the unlocked position until the handle is in the second position.

6. The latch assembly according claim 1 in combination with a striker assembly, the striker assembly including a catch coupled to a striker frame to hold the bolt in the locked position, a release shaft biased to hold the striker frame in a latched position, and a release lever for moving the release shaft allowing movement of the catch to an unlatched position.

7. The combination according to claim 6, wherein the release lever includes an arm movable by a user and a pair of spaced legs that abut the release shaft to move the release shaft.

8. The combination according to claim 6, wherein the catch is biased in the latched position and includes a body having an angled surface over which the bolt moves when moving to the locked position.

9. The latch assembly according to claim 1, wherein the latch further includes a timing block positioned in the cavity and a resilient member seated against the projection and the timing block, wherein the bolt surrounds the timing block, and wherein the damping mechanism abuts the timing block and extends through the projection in the housing.

10. A latch assembly for delaying opening of a door in an aircraft, the latch assembly including:

a housing defining a cavity;

a latch disposed in the cavity, the latch having a bolt movable between a locked and an unlocked position and a damping mechanism for delaying movement of the bolt from the locked position to the unlocked position; and a handle assembly including at least one handle, a rack disposed in the cavity, and a cam shaft movable with the handle, the cam shaft including a pinion portion that engages the rack, wherein the handle is movable from a first position holding the bolt in the locked position to a second position allowing for movement of the bolt to the unlocked position to allow for opening of the door.

11. The latch assembly according to claim 10, wherein the cam shaft additionally includes a cam arm for holding the bolt in the first position.

12. The latch assembly according to claim 11, wherein the cam shaft additionally includes a hook coupled to a resilient member, the resilient member biasing the handle in the first position.

13. The latch assembly according to claim 10, wherein the rack is configured to prevent movement of the bolt from the unlocked position when the handle is in the second position.

14. A latch assembly including:

a housing defining a cavity and including a projection in the cavity;

a handle assembly including a handle movable relative to the housing and a cam shaft, the cam shaft including a cam arm, a pinion portion, and a hook; and a latch disposed in the cavity, the latch having a timing block positioned in the cavity, a bolt positioned in the cavity surrounding the timing block and being movable between a locked and an unlocked position, a damping mechanism abutting the timing block and extending through the projection of the housing for delaying movement of the bolt, and a resilient member seated against the projection and the timing block, the timing block including a timing block body, a first opening that receives the damping mechanism and the resilient member, a timing block projection extending from a bottom of the timing block body through the bottom of a bolt for engaging with the cam arm on the handle assembly, an second opening that aligns with the bolt, and a third opening that aligns with the housing, wherein the handle is biased in a first position abutting the bolt to hold the bolt in the locked position, and the handle is movable to a second position away from the bolt allowing for movement of the bolt to the unlocked position.

* * * * *